(12) United States Patent
Rosen et al.

(10) Patent No.: US 11,596,118 B2
(45) Date of Patent: Mar. 7, 2023

(54) INTELLIGENT HORTICULTURE LIGHT

(71) Applicant: Resilience Magnum IP, LLC, Cleveland, OH (US)

(72) Inventors: Steven Rosen, Hunting Valley, OH (US); Ronald Cozean, Madison, CT (US); Eric Allen, Long Beach, CA (US); David Edward Mordetzky, Oak Park, CA (US); Megan Horvath, Cleveland, OH (US); Anthony John Pyros, Cleveland, OH (US); John Elwood, Santa Ana, CA (US); Michael Chang, Long Beach, CA (US); Elie Attarian, Chatsworth, CA (US)

(73) Assignee: Resilience Magnum IP, LLC, Cleveland, OH (US)

( * ) Notice: Subject to any disclaimer, the term of this patent is extended or adjusted under 35 U.S.C. 154(b) by 332 days.

(21) Appl. No.: 16/043,875

(22) Filed: Jul. 24, 2018

(65) Prior Publication Data

US 2019/0098843 A1   Apr. 4, 2019

Related U.S. Application Data

(60) Provisional application No. 62/625,417, filed on Feb. 2, 2018, provisional application No. 62/568,294, filed on Oct. 4, 2017.

(51) Int. Cl.
*A01G 9/24* (2006.01)
*A01G 25/16* (2006.01)
(Continued)

(52) U.S. Cl.
CPC ........... *A01G 25/167* (2013.01); *A01G 7/045* (2013.01); *A01G 9/249* (2019.05); *G02F 1/01* (2013.01);
(Continued)

(58) Field of Classification Search
CPC ...... A01G 9/249; A01G 7/045; A01G 25/167; A01G 7/04
See application file for complete search history.

(56) References Cited

U.S. PATENT DOCUMENTS

| 6,147,624 A | 11/2000 | Clapper |
| 6,236,303 B1 | 5/2001 | Wagner et al. |

(Continued)

FOREIGN PATENT DOCUMENTS

| CN | 105371177 A | 3/2016 |
| GN | 105959380 A | 9/2016 |

OTHER PUBLICATIONS

Non-Final Office Action received for U.S. Appl. No. 16/043,974 dated May 2, 2019, 28 pages.

(Continued)

*Primary Examiner* — Kristen C Hayes
(74) *Attorney, Agent, or Firm* — Amin, Turocy & Watson, LLP

(57) ABSTRACT

Techniques for horticulture light are provided. A horticulture light can monitor at least one characteristic of a defined region in which at least one plant is planted in a horticulture environment in which horticulture light bulb is installed, determine at least one action for the horticulture light bulb to perform based on a state of the at least one characteristic and at least one objective of the installation of the horticulture light bulb in the horticulture environment, and execute the at least one action.

20 Claims, 19 Drawing Sheets

(51) Int. Cl.
*G02F 1/01* (2006.01)
*A01G 7/04* (2006.01)
*H05B 45/10* (2020.01)
*H05B 47/10* (2020.01)
*H05B 47/175* (2020.01)

(52) U.S. Cl.
CPC ............. *H05B 45/10* (2020.01); *H05B 47/10* (2020.01); *H05B 47/175* (2020.01)

(56) References Cited

U.S. PATENT DOCUMENTS

| | | | |
|---|---|---|---|
| 6,528,954 | B1 | 3/2003 | Lys |
| 6,946,974 | B1 | 9/2005 | Racunas Jr. |
| 7,026,954 | B2 | 4/2006 | Slemmer et al. |
| 7,111,952 | B2 | 9/2006 | Veskovic |
| 7,824,065 | B2 | 11/2010 | Maxik |
| 8,280,558 | B2 | 10/2012 | Picco |
| 8,283,812 | B2 | 10/2012 | Azancot et al. |
| 8,362,713 | B2 | 1/2013 | Recker et al. |
| 8,545,033 | B2 | 10/2013 | Gielen |
| 8,600,786 | B2 | 12/2013 | Stefik et al. |
| 8,674,616 | B2 | 3/2014 | Holman et al. |
| 8,950,461 | B2 | 2/2015 | Adams et al. |
| 9,367,050 | B2 | 6/2016 | Jain et al. |
| 9,560,388 | B2 | 1/2017 | Ogle et al. |
| 9,594,956 | B2 | 3/2017 | Cohen et al. |
| 9,595,193 | B1 | 3/2017 | Duale et al. |
| 9,601,018 | B2 | 3/2017 | Cogill et al. |
| 9,644,799 | B2 * | 5/2017 | Crayford ................. F21V 3/061 |
| 9,700,641 | B2 | 7/2017 | Hawkins et al. |
| 9,893,551 | B2 | 2/2018 | Cheatham, III et al. |
| 9,938,765 | B2 | 4/2018 | Berman et al. |
| 10,210,355 | B1 | 2/2019 | Lai |
| 10,251,242 | B1 * | 4/2019 | Rosen ................... H04L 12/282 |
| 10,574,757 | B2 | 2/2020 | Rosen et al. |
| 10,677,402 | B2 | 6/2020 | Rosen et al. |
| 10,867,486 | B2 | 12/2020 | Rosen et al. |
| 2002/0171562 | A1 | 11/2002 | Muraki |
| 2004/0022058 | A1 | 2/2004 | Birrell |
| 2005/0128751 | A1 | 6/2005 | Roberge et al. |
| 2005/0248299 | A1 | 11/2005 | Chemel et al. |
| 2006/0044798 | A1 | 3/2006 | Pazula |
| 2006/0197684 | A1 | 9/2006 | Tremblay |
| 2008/0191009 | A1 | 8/2008 | Gressel et al. |
| 2009/0059603 | A1 | 3/2009 | Recker et al. |
| 2009/0303079 | A1 | 12/2009 | Khim |
| 2010/0007525 | A1 | 1/2010 | Shanbhag et al. |
| 2010/0060485 | A1 | 3/2010 | Kim |
| 2010/0271802 | A1 | 10/2010 | Recker et al. |
| 2010/0309024 | A1 | 12/2010 | Mimeault |
| 2011/0006893 | A1 | 1/2011 | Finch et al. |
| 2011/0193872 | A1 | 8/2011 | Biernath et al. |
| 2012/0011033 | A1 | 1/2012 | Salgia |
| 2012/0066144 | A1 | 3/2012 | Berkvens et al. |
| 2012/0092192 | A1 | 4/2012 | Wong |
| 2012/0098655 | A1 | 4/2012 | Preta et al. |
| 2013/0002587 | A1 | 1/2013 | Biggs et al. |
| 2013/0073350 | A1 | 3/2013 | Blustein |
| 2013/0113936 | A1 | 5/2013 | Cohen et al. |
| 2013/0300911 | A1 | 11/2013 | Beckman |
| 2014/0049963 | A1 | 2/2014 | McGuire |
| 2014/0049972 | A1 | 2/2014 | McGuire |
| 2014/0055990 | A1 | 2/2014 | Reed |
| 2014/0217914 | A1 | 8/2014 | Maxik |
| 2014/0262057 | A1 | 9/2014 | Chambers et al. |
| 2015/0195100 | A1 | 7/2015 | Imes et al. |
| 2015/0286938 | A1 | 10/2015 | Blair et al. |
| 2016/0047164 | A1 | 2/2016 | Lundy et al. |
| 2016/0085884 | A1 | 3/2016 | Schafer et al. |
| 2016/0104325 | A1 | 4/2016 | Lu |
| 2016/0135271 | A1 * | 5/2016 | Alexander ............. H05B 47/19 315/297 |
| 2016/0216443 | A1 | 7/2016 | Morgan et al. |
| 2016/0359325 | A1 | 12/2016 | Kawata et al. |
| 2017/0073074 | A1 | 3/2017 | Gagnon et al. |
| 2017/0094756 | A1 * | 3/2017 | Saffari ................... A01K 63/06 |
| 2017/0192406 | A1 | 7/2017 | Ashdown et al. |
| 2017/0247289 | A1 | 8/2017 | Waldschmidt et al. |
| 2017/0322350 | A1 | 11/2017 | Montagne |
| 2018/0096634 | A1 | 4/2018 | Walker et al. |
| 2018/0154032 | A1 | 6/2018 | Dombrovsky |
| 2018/0156429 | A1 | 6/2018 | Carlet et al. |
| 2018/0163934 | A1 | 6/2018 | Miller |
| 2018/0167516 | A1 | 6/2018 | Warrick |
| 2018/0211503 | A1 | 7/2018 | Baliga et al. |
| 2018/0216791 | A1 | 8/2018 | Leung et al. |
| 2018/0224596 | A1 | 8/2018 | Creasman et al. |
| 2018/0259141 | A1 | 9/2018 | Yamaguchi et al. |
| 2018/0313660 | A1 | 11/2018 | Eyster et al. |
| 2019/0069379 | A1 | 2/2019 | Kastee et al. |
| 2019/0104181 | A1 * | 4/2019 | Rosen ................... H05B 45/00 |

OTHER PUBLICATIONS

Notice of Allowance received for U.S. Appl. No. 16/043,997 dated Aug. 7, 2020, 46 pages.
Non-Final Office Action received for U.S. Appl. No. 16/856,434 dated Sep. 1, 2020, 50 pages.
Final Office Action received for U.S. Appl. No. 16/682,085 dated Oct. 28, 2020, 27 pages.
Final Office Action received for U.S. Appl. No. 16/682,085 dated Oct. 8, 2020, 29 pages.
Office Action received for U.S. Appl. No. 16/739,627 dated Apr. 26, 2021, 31 pages.
Non-Final Office Action received for U.S. Appl. No. 16/043,798 dated Jun. 27, 2019, 15 pages.
Non-Final Office Action received for U.S. Appl. No. 16/130,720 dated Jul. 25, 2019, 37 pages.
Non-Final Office Action received for U.S. Appl. No. 16/270,646 dated Aug. 21, 2019, 29 pages.
Non-Final Office Action received for U.S. Appl. No. 16/044,047 dated Dec. 26, 2018, 22 pages.
Notice of Allowance received for U.S. Appl. No. 16/044,073 dated Nov. 8, 2018, 20 pages.
Non-Final Office Action received for U.S. Appl. No. 16/739,627 dated Feb. 7, 2020, 19 pages.
Non-Final Office Action received for U.S. Appl. No. 16/544,023 dated Apr. 9, 2020, 28 pages.
Non-Final Office Action received for U.S. Appl. No. 16/043,997 dated Apr. 8, 2020, 46 pages.
Non-Final Office Action received for U.S. Appl. No. 16/821,007 dated May 1, 2020, 36 pages.
Non-Final Office Action received for U.S. Appl. No. 16/044,027 dated Jun. 22, 2020, 48 pages.
Notice of Allowance received for U.S. Appl. No. 16/043,949 dated May 21, 2020, 49 pages.
Non-Final Office Action received for U.S. Appl. No. 16/043,875 dated Jul. 8, 2020, 36 pages.
Final Office Action received for U.S. Appl. No. 16/739,627 dated Sep. 30, 2021, 33 pages.
Non-Final Office Action received for U.S. Appl. No. 17/099,898 dated Sep. 24, 2021, 68 pages.
Non-Final Office Action received for U.S. Appl. No. 17/036,417 dated Mar. 30, 2022, 61 pages.
Non-Final Office Action received for U.S. Appl. No. 16/044,027 dated Jun. 9, 2021, 29 pages.
Non-Final Office Action received for U.S. Appl. No. 17/062,929 dated May 5, 2021, 38 pages.
Non-Final Office Action received for U.S. Appl. No. 17/099,928 dated Jun. 24, 2021, 53 pages.
Notice of Allowance received for U.S. Appl. No. 17/005,534 dated Aug. 4, 2021, 50 pages.
Notice of Allowance received for U.S. Appl. No. 17/062,929 dated Aug. 9, 2021, 27 pages.
Non-Final Office Action received for U.S. Appl. No. 17/481,994 dated Sep. 15, 2022, 38 pages.

(56) References Cited

OTHER PUBLICATIONS

Non-Final Office Action received for U.S. Appl. No. 17/518,132 dated Sep. 21, 2022, 37 pages.
Final Office Action received for U.S. Appl. No. 17/036,417 dated Oct. 12, 2022, 33 pages.

\* cited by examiner

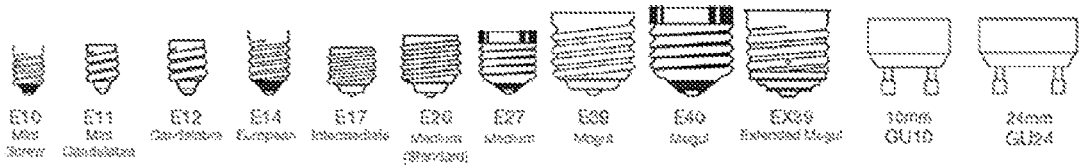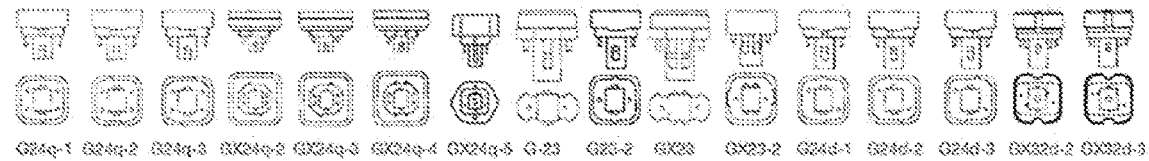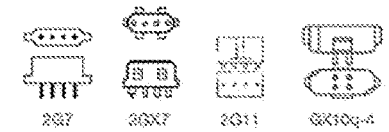
FIG. 4

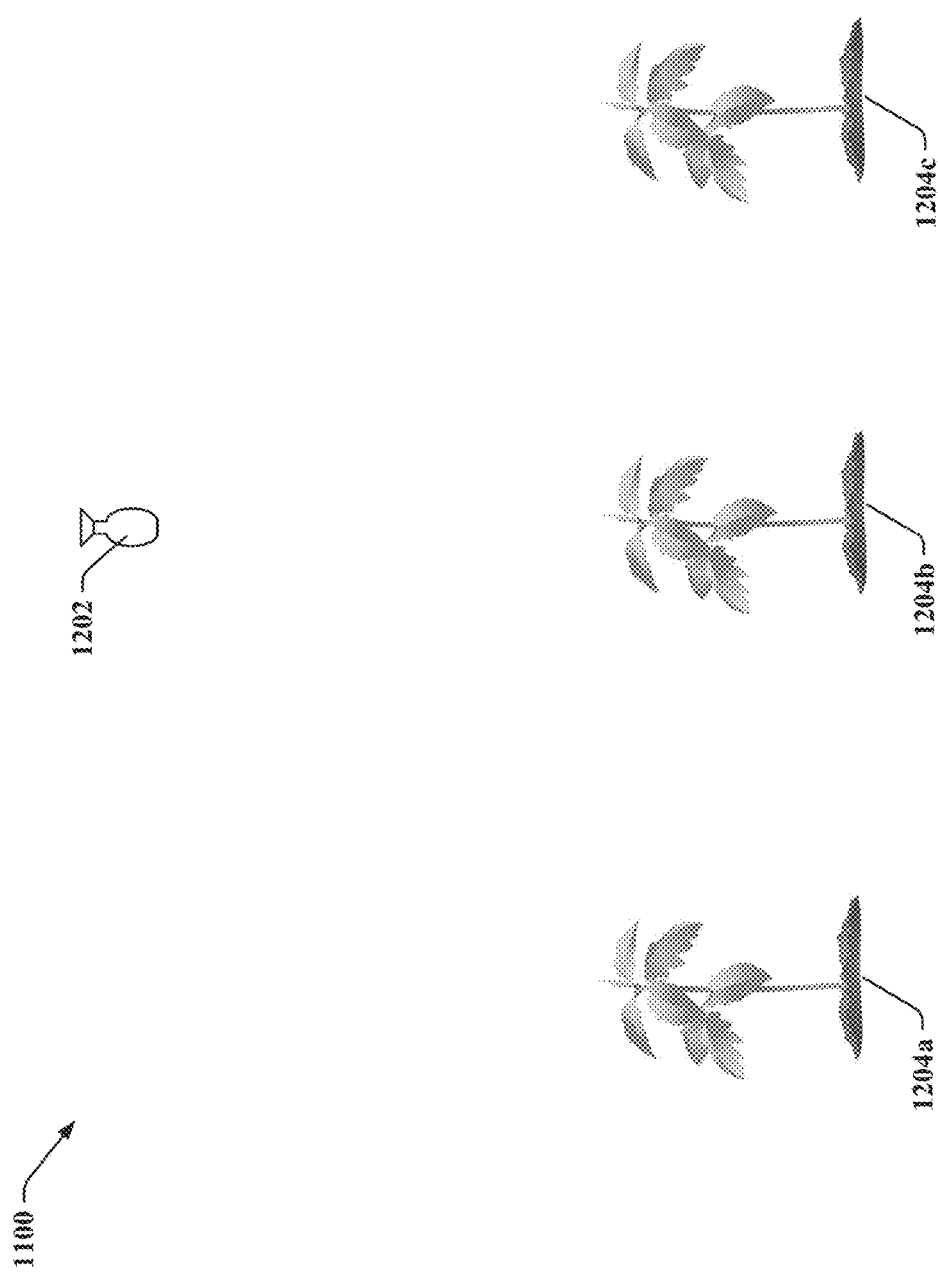

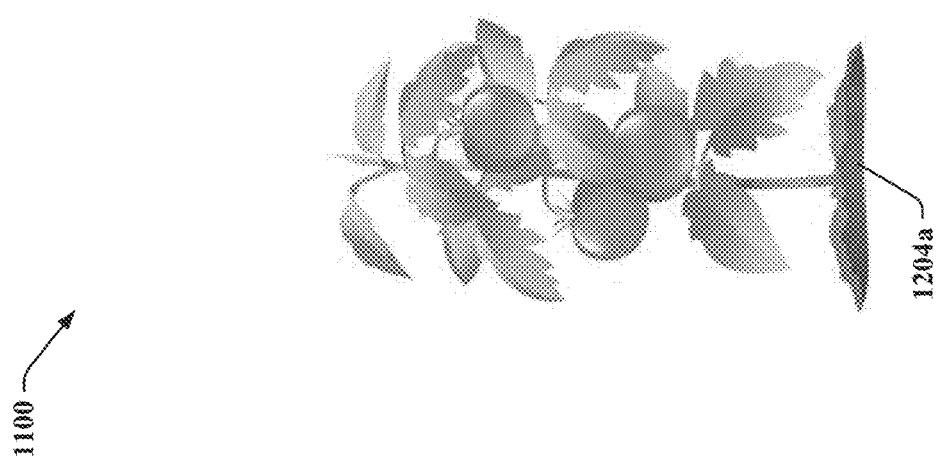
FIG. 12D

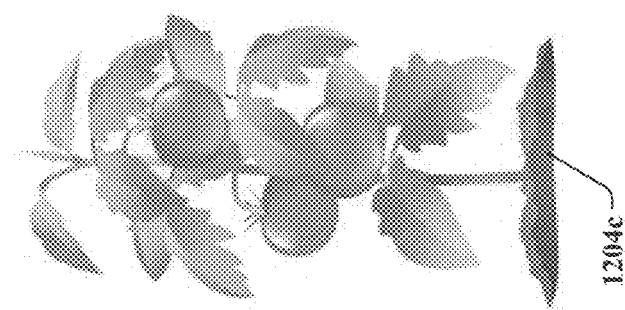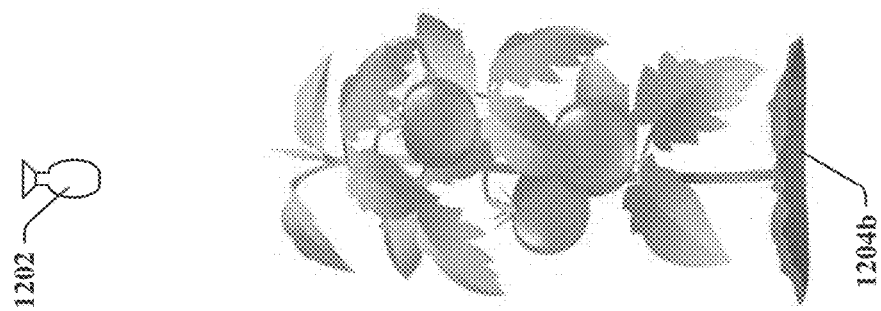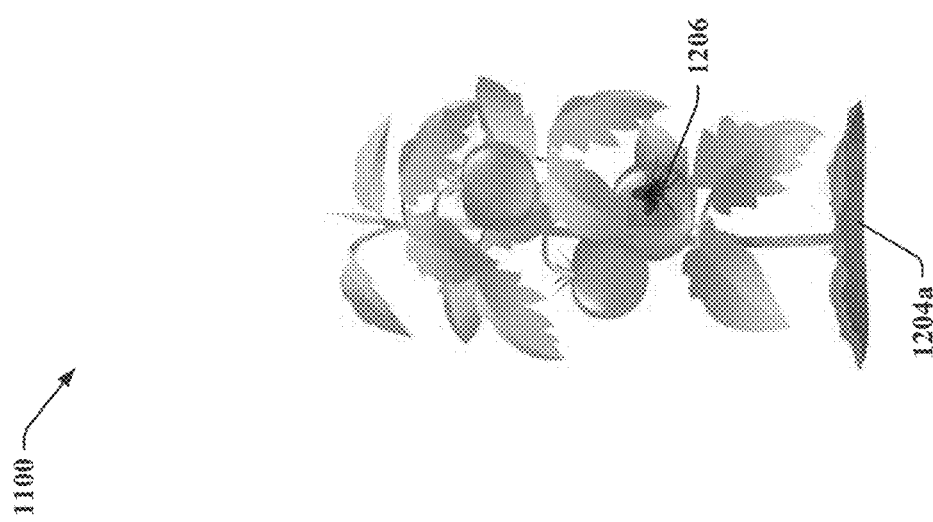
FIG. 12E

INTELLIGENT HORTICULTURE LIGHT

CROSS-REFERENCE TO RELATED APPLICATIONS

This application claims priority to U.S. Provisional Patent Application Ser. No. 62/625,417 filed on Feb. 2, 2018, entitled "INTELLIGENT HORTICULTURE LIGHT" and U.S. Provisional Patent Application Ser. No. 62/568,294 filed on Oct. 4, 2017, entitled "SELF AWARE LIGHTS THAT SELF-CONFIGURE." The entireties of the aforementioned applications are incorporated by reference herein.

BACKGROUND

The subject disclosure relates generally to horticulture lights for growing plants.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate a horticulture light that efficiently enhances growth of plants are described.

According to an embodiment, a horticulture light bulb is provided. The horticulture light bulb comprises one or more instruments, a memory that stores computer executable components, and a processor that executes the computer executable components stored in the memory. The computer executable components can comprise: a monitoring component that employs at least one instrument of the one or more instruments to monitor at least one characteristic of a defined region in which at least one plant is planted in a horticulture environment in which horticulture light bulb is installed; and an operation component that: determines at least one action for the horticulture light bulb to perform based on a state of the at least one characteristic and at least one objective of the installation of the horticulture light bulb in the horticulture environment, and executes the at least one action.

In another embodiment, a horticulture light is provided. The horticulture light comprises a horticulture light fixture, a horticulture light bulb configured for installation in the horticulture light fixture, one or more instruments located in at least one of the horticulture light bulb or the horticulture light fixture, a memory that stores computer executable components, and a processor that executes the computer executable components stored in the memory. The computer executable components can comprise: a monitoring component that employs at least one instrument of the one or more instruments to monitor at least one characteristic of a defined region in which at least one plant is planted in a horticulture environment in which horticulture light is installed; and an operation component that: determines at least one action for the horticulture light to perform based on a state of the at least one characteristic and at least one objective of the installation of the horticulture light in the horticulture environment, and executes the at least one action.

In another embodiment, a method comprises: determining, by a horticulture light bulb via one or more instruments of the horticulture light bulb, one or more characteristics of a horticulture environment in which horticulture light bulb is installed; determining, by the horticulture light bulb, one or more capabilities of the horticulture light bulb; generating, by the horticulture light bulb, one or more objectives for the horticulture light bulb based on the one or more characteristics and the one or more capabilities; and configuring, by the horticulture light bulb, an operation of the horticulture light bulb to achieve the one or more objectives related to at least one plant planted in the horticulture environment.

DESCRIPTION OF THE DRAWINGS

FIG. 4 illustrates example, non-limiting standard base types for base of horticulture light bulb in accordance with one or more embodiments described herein.

FIGS. 12A-12E illustrate a block diagram of an example, non-limiting horticulture environment in which a horticulture light is installed in accordance with one or more embodiments described herein.

DETAILED DESCRIPTION

Figure 1:
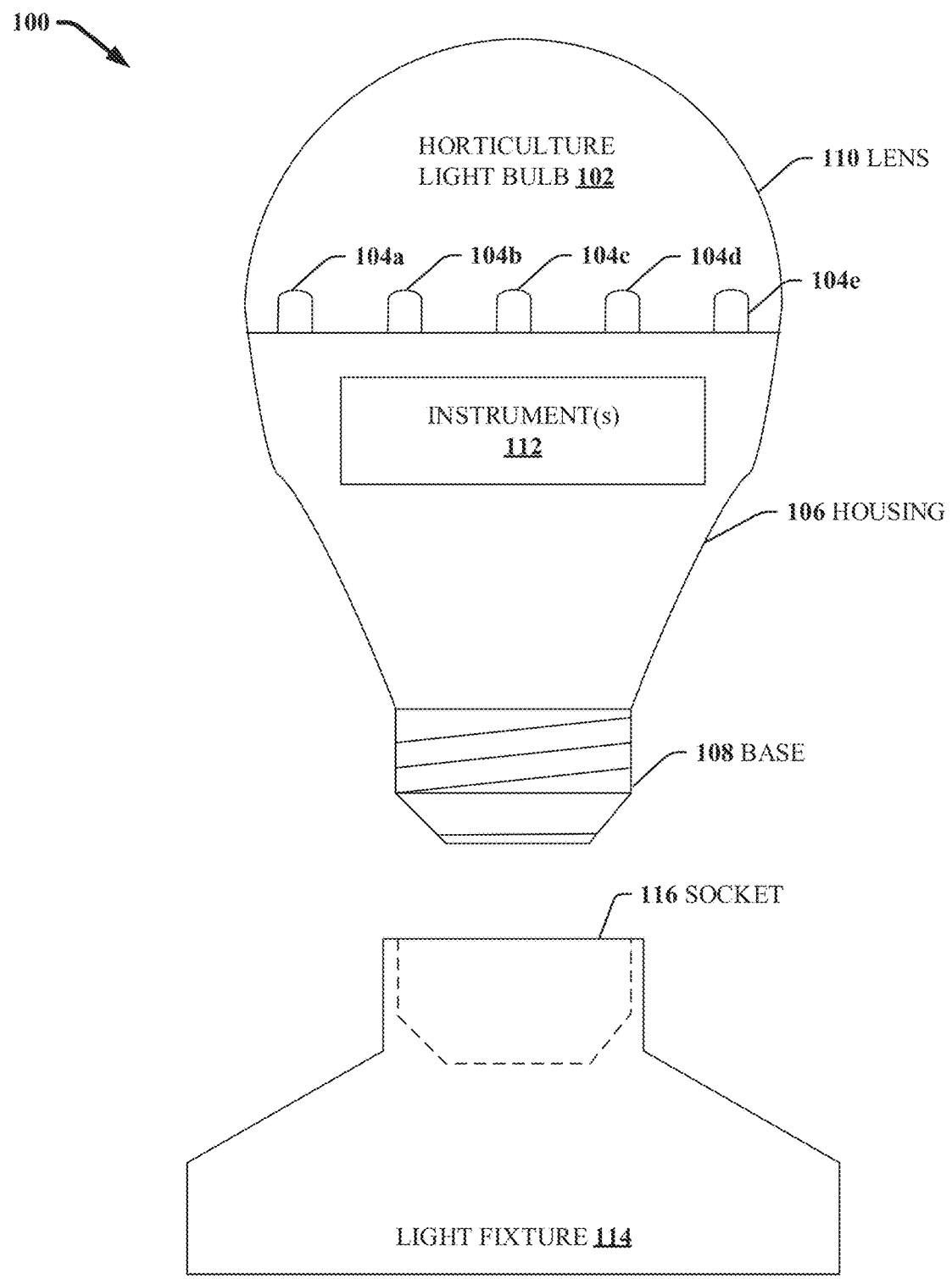
FIG. 1 illustrates a block diagram of an example, non-limiting horticulture light in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however in various cases, that the one or more embodiments can be practiced without these specific details.

Horticulture environment (e.g. grow room, greenhouse, field, indoor environment, outdoor environment, liquid environment, or any other suitable horticulture environment) can employ a significant amount of artificial lighting for plants that are growing in the horticulture environment. Typically, conventional lights in horticulture environment use substantial energy with an associated significant cost for power. Additionally, the conventional lights in these horticulture rooms have a fixed spectrum and are limited to on or off.

There is a need for smarter lights in these horticulture environments that can efficiently (e.g. utility, economically, effectively, beneficially, optimally, etc.) enhance growth of plants. It is to be appreciated that efficiency can be based on an objective (e.g. goal, result, outcome, intention, purpose, action, operation, configuration, etc.) of the horticulture environment defined by a user and/or the system. For example, the objective can relate to maximizing plant growth, maximizing fruit bearing, maximizing profits, minimizing energy usage, achieving a defined plant characteristic, balancing resource usage versus plant growth according to a defined criterion, or any other suitable objective or combination of objectives associated with a horticulture environment.

In accordance with various disclosed aspects, a horticulture light that comprises instruments, and is able to communicate with other horticulture lights and other devices is presented that efficiently utilizes resources to enhance growth of plants. The horticulture light can understand its horticulture environment and device ecosystem using the instruments, and perform a self-configuration to optimize its functionality to enhance growth of plants in the horticulture environment and device ecosystem. For example, the horticulture light can employ sensors to monitor plants in the horticulture environment, and customize light output and/or control other systems (e.g. temperature, humidity, watering, fertilizing, feeding, pollination, insect repellent, sound, air flow, air quality, windows, robots, or any other suitable systems associated with horticulture) to enhance growth of the plants based on their plant characteristics (e.g. type of plant, stage of growth, health, disease, pest infestation, or any other suitable characteristics associated with the plants) and/or environmental characteristics (e.g. temperature, humidity, ambient lighting, air quality, water quality, soil quality, soil moisture, pests, location, location relative to other plants, ambient sounds, or any other suitable characteristic associated with a horticulture environment).

The horticulture light has artificial intelligence capabilities and can employ sensors to monitor environmental condition in a horticulture environment and growth conditions of plants in the horticulture room, and optimize its function to manage costs of operation of the horticulture room and maximize plant growth. For example, the horticulture light can employ pattern recognition to determine characteristics, such as a type of plant, stage of growth, development of the plant over time, disease affecting the plant, environment in which the plant is located, other plants nearby, spacing between plants, lighting conditions, plant watering conditions, soil condition, air condition, pest condition, fruit/flower yield, or any other suitable condition associated with the plant(s) growing in the horticulture room. Based on the characteristics, the horticulture light can adjust light output (e.g. spectrum, wavelength, frequency, intensity, pattern, direction, etc.) to optimize plant growth and cost (e.g. cost-benefit analysis). A set of horticulture lights can operate in a coordinated manner to optimize plant growth and cost for one or more plants.

In an example, the horticulture light can learn over time lighting, watering, soil, air, plant spacing, and other conditions that enhance plant growth for respective plant types and adjust operations accordingly. The horticulture light can adjust its lights, employ tools, or instruct other devices/systems on operations to enhance plant growth. For example, the horticulture light can employ a built in tool (e.g. audio, light pattern, scent, blower, etc.) to drive away a pest. For example, the horticulture light can instruct a water system to increase water flow to one or more plants. In another example, horticulture light can instruct a HVAC system to adjust temperature or air filtering. In a further example, horticulture light can alert a person to remove a diseased plant. In an additional example, horticulture light can instruct a system or person to increase spacing between plants to enhance growth.

In another example, the horticulture lights can aggregate data to a cloud horticulture platform, where data can be analyzed along with data from other horticulture environments to share/learn best practices in connection with optimizing plant growth and cost. The cloud horticulture platform can act as a crowd sourcing platform for horticulture information. Best practices learned from one horticulture environment can be propagated to other horticulture environments. Horticulture light can obtain learned best practices from cloud horticulture platform and implement the best practices in the horticulture room.

A set of horticulture lights can operate in a coordinated manner to determine the plant characteristics and/or environmental characteristics for one or more plants. For example, two or more horticulture lights can have differing views of a plant, and communicate with each other to make determinations regarding plant characteristics of the plant. Horticulture lights can form a mesh communication network to relay communications amongst each other and to other devices.

It is to be appreciated that the horticulture light can be a retrofit light bulb with instruments integrated therein. In another embodiment, the horticulture light can have all or a portion of the instruments integrated into a light fixture (e.g. socket, holder, ballast) for the horticulture light. A horticulture light can learn about its context and customize its configuration and/or operation in accordance with the context (e.g. using artificial intelligence). This can eliminate or minimize the need for an operator (e.g. user, administrator, or any other suitable entity) to perform manual configuration. Furthermore, a set of horticulture lights can automatically perform coordinated self-configuration and operation. All examples below can involve coordination amongst a set of horticulture lights to achieve a horticulture objective, whether explicitly stated or not. Further, although the term "horticulture light" is used herein, in various embodiments, the examples provided can include one or more horticulture lights operating independently or in a distributed fashion, as applicable. All such embodiments are envisaged.

Figure 2:
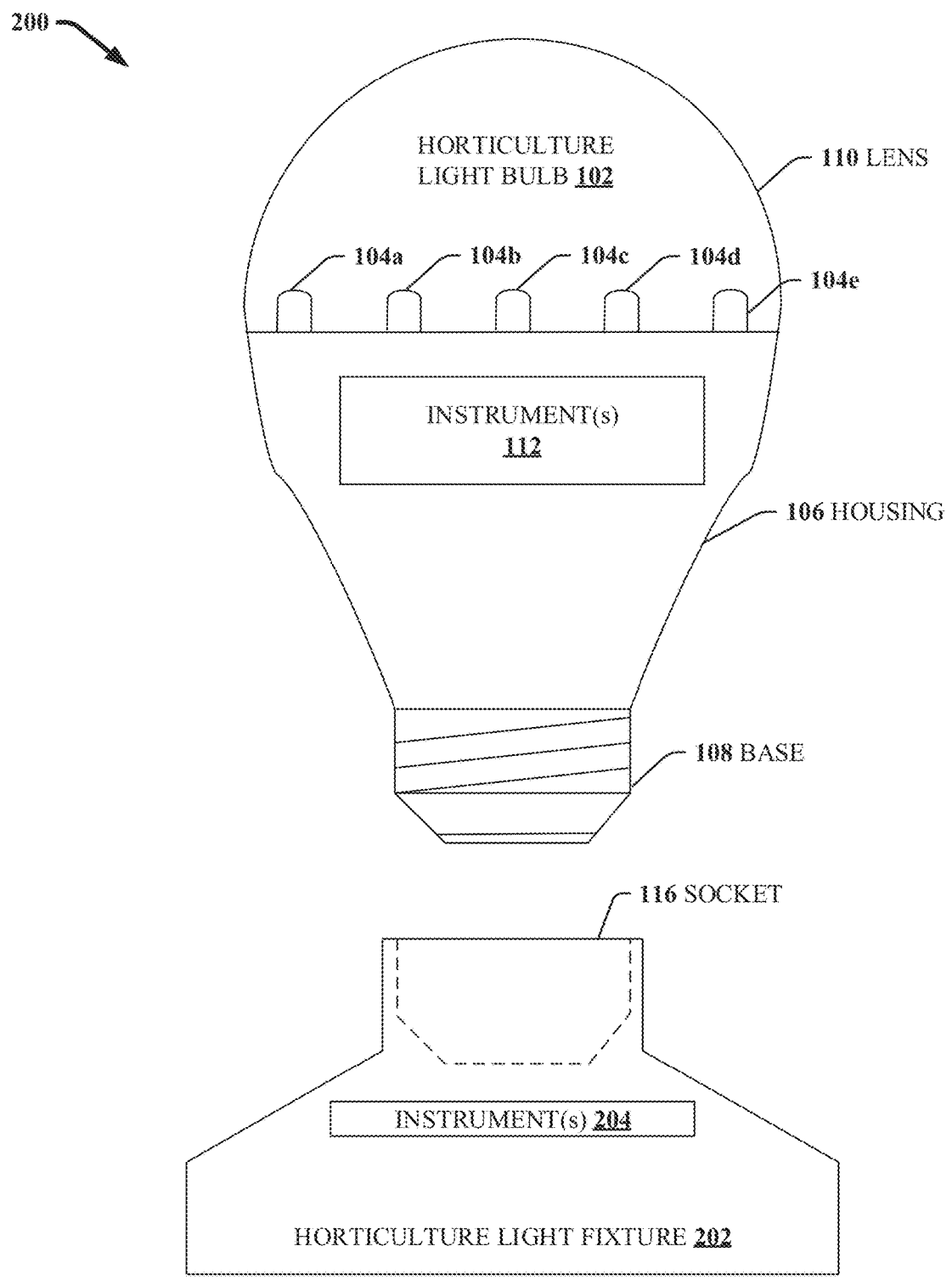
FIG. 2 illustrates a block diagram of an example, non-limiting horticulture light in accordance with one or more embodiments described herein.

FIGS. 1-2 illustrate block diagrams of example, non-limiting horticulture lights 100, 200 in accordance with one or more embodiments described herein. The subject disclosure is directed to computer processing systems, computer-implemented methods, apparatus and/or computer program products that facilitate efficiently and automatically (e.g., with little or no direct involvement from an operator) employing horticulture lights 100, 200 that utilize resources (e.g. light output characteristics, sunlight, energy, water, fertilizer, feed, insecticide, pest repellant, chemicals, devices, bees, or any other suitable resource employed in horticulture) to enhance growth of plants. For example, when installed, horticulture light 100, 200 can employ sensors, tools, and communication devices to determine its place in the horticulture environment and device ecosystem and perform an auto-configuration efficiently utilizes resources to enhance growth of plants. In an example, horticulture light 100, 200 can employ sensors to understand the physical environment in which it is installed, and determine how it fits into the physical environment. In another example, horticulture light 100, 200 can communicate on one or more networks to identify other horticulture lights 100, 200 and other devices in the device ecosystem, and determine how it fits into the device ecosystem. Based on the determinations, horticulture light 100, 200 can perform an autoconfiguration to efficiently enhance plant according to a defined objective set by an operator and/or the system. It is to be appreciated that a user interface (not shown) can be provided that allows an operator to manually adjust the configuration generated by the horticulture light 100, 200.

In order to facilitate self-configuration, horticulture lights 100, 200 described herein can be employed that are communicating with each other, communicating with another device. The horticulture lights 100, 200 can coordinate amongst themselves to make decisions regarding actions to be taken by the horticulture lights 100, 200. Horticulture lights 100, 200 can receive instructions from another device, such as a control system, regarding actions to be taken by the horticulture lights 100, 200. Horticulture lights 100, 200 can receive instructions from an operator, regarding actions to be taken by the horticulture lights 100, 200. A horticulture light 100, 200 can autonomously make decisions regarding actions to be taken by the horticulture light 100, 200. It is to be appreciated that horticulture lights can employ any of the aforementioned decision-making methods, alone or in combination, regarding actions to be taken by the horticulture lights 100, 200.

FIG. 1 illustrates a block diagram of an example, non-limiting horticulture light 100 in accordance with one or more embodiments described herein. Horticulture light 100 comprises a horticulture light bulb 102 which can be installed as a retrofit into a socket 116 of conventional light fixture 114. Horticulture light bulb 102 comprises one or more light emitting devices 104a, 104b, 104c, 104d, and 104e (e.g. light emitting diode (LED), organic light emitting diode (OLED), filament, quantum dot, incandescent, high-intensity discharge (HID), neon, fluorescent, compact fluorescent (CFL), electroluminescent (EL), laser, or any other suitable light emitting device) a housing 106, a base 108, a lens 110, and one or more instruments 112. It is to be appreciated that while five light emitting devices 104a, 104b, 104c, 104d, and 104e are depicted for illustrative purposes only, horticulture light bulb 102 can include any suitable number of light emitting devices. It is also to be appreciated that horticulture light bulb 102 can include other components (not shown) or exclude one or more components. For example, horticulture light bulb 102 can exclude lens 110. In another example, horticulture light bulb 102 can include one or more reflectors, one or more shades, one or more positioning motors, or any other suitable components needed according to functionality described herein.

FIG. 2 illustrates a block diagram of an example, non-limiting horticulture light 200 in accordance with one or more embodiments described herein. Horticulture light 100 comprises a horticulture light bulb 102 which can be installed into a socket 116 of a horticulture light fixture 202. Horticulture light fixture 202 comprises one or more instruments 204. It is to be appreciated that horticulture light fixture 202 can include other components (not shown) or exclude one or more components. For example, horticulture light fixture 202 can include one or more light emitting devices, one or more reflectors, one or more shades, one or more positioning motors, or any other suitable components needed according to functionality described herein. It is to be appreciated that horticulture light bulb 102 can communicate with horticulture light fixture 202 via wired or wireless communications. For example, base 108 connecting to socket 116 can form a wired communication connection.

While FIGS. 1-2 depict a horticulture light bulb 102 fitting into a light fixture 114, 202, it is to be appreciated that a single light fixture 114, 202 can comprise a plurality of sockets 116 for installation of a plurality of horticulture light bulbs 102.

Figure 3:
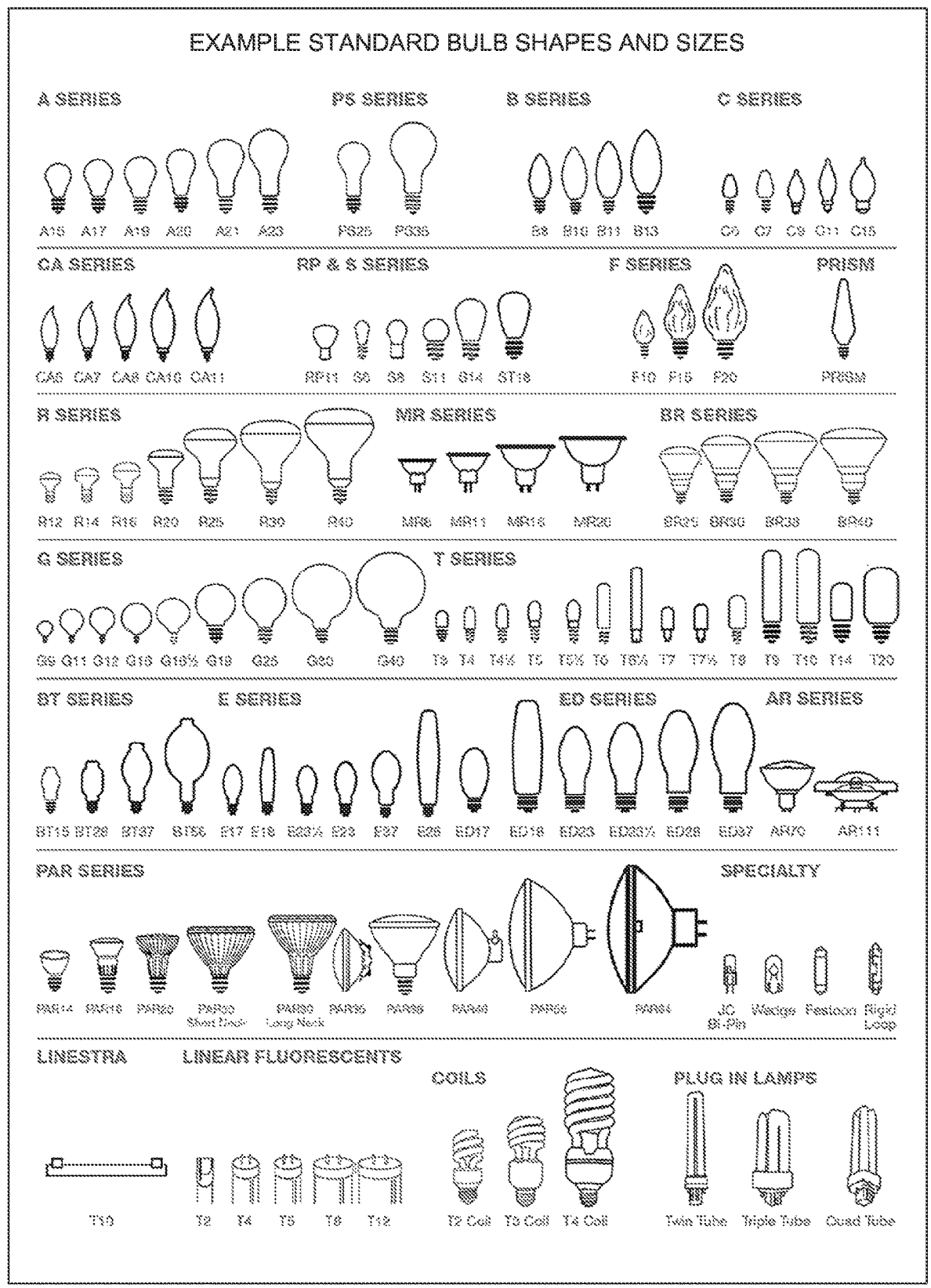
FIG. 3 illustrates example, non-limiting standard bulb shapes and size for horticulture light bulb in accordance with one or more embodiments described herein.

FIG. 3 illustrates example, non-limiting standard bulb shapes and size for horticulture light bulb 102. It is to be appreciated that horticulture light bulb 102 can be customized to be in any suitable shape and any suitable size for an application in which horticulture light bulb 102 is to be installed.

FIG. 4 illustrates example, non-limiting standard base types for base 108. It is to be appreciated that base 108 can be customized to be in any suitable form for an application in which horticulture light bulb 102 is to be installed. Likewise, socket 116 can be customized to be compatible with base 108. Additionally, horticulture light fixture 202 can be customized to be in any suitable form for an application in which horticulture light 200 is to be installed.

A horticulture light 100, 200 can include a power source, non-limiting examples of which include electrical grid power, battery, electrochemical cell, fuel cell, natural gas generated electric power, compressed air generated electric power, diesel fuel generated electric power, gasoline generated electric power, oil generated electric power, propane generated electric power, nuclear power system, solar power system, wind power system, piezoelectric power system, micro-electrical mechanical systems (MEMS)-generated electric power, inductive power system, radio-frequency power system, wireless power transfer mechanism, or any other suitable power source. In an example, a horticulture light 100, 200 can have a constantly available power source, such as that provided by an electrical power grid. In another example, a horticulture light 100, 200 can have a temporary power source, such as a battery (e.g. disposable battery or rechargeable battery). In a further example, a horticulture light 100, 200 can generate and store its own power, such as by solar, fuel cell, radio-frequency harvesting, induction, piezoelectric, electro-mechanical, chemical, nuclear, carbon based-fuel, or any other suitable self-generating power source. This is advantageous for long-term installations (e.g. where frequent battery changes would be required) that do not have a constantly available power source, such as an outdoor environment where a power outlet is not available (e.g. a porch, a yard, a camping site, a farm field, a park, a sports field, etc.), or an indoor location where a power outlet is not available (e.g. a closet, a sunroom, a cabinet, a drawer, a garage, a barn, a shed, an indoor location where an extension cord is not desired, etc.). It is to be appreciated that horticulture light 100, 200 can have a plurality of different power sources, with one or more power sources acting as a backup for another power source. It is to be appreciated that horticulture light 100, 200 can have configurable power sources. For example, horticulture light 100, 200 can have a modular configuration that allows for one or more power sources to be added or removed by a manufacturer or operator.

A horticulture light 100, 200 can include one or more computers, one or more processors, one or more memories, and one or more programs. A horticulture light 100, 200 can communicate via any suitable form of wireless or wired communication using a communication device. Non-limiting examples of wireless communication can include radio communication, optical communication, sonic communication, electromagnetic induction communication, or any other suitable wireless communication. A horticulture light 100, 200 can include one or more instruments 112, 204, non-limiting examples of which include a communication device, a radio frequency identification (RFID) reader, a navigation device, a camera, a video camera, a three-dimensional camera, a global positioning system (GPS) device, a motion sensor, a radar device, a temperature sensor, a weather sensor, a humidity sensor, a barometer, a Doppler radar, a light sensor, a thermal imaging device, an infrared camera, an audio sensor, an ultrasound imaging device, a light detection and ranging (LIDAR) sensor, sound navigation and ranging (SONAR) device, a microwave sensor, a chemical sensor, a radiation sensor, an electromagnetic field sensor, a pressure sensor, a spectrum analyzer, a scent sensor, a moisture sensor, a biohazard sensor, a touch sensor, a gyroscope, an altimeter, a microscope, magnetometer, a device capable is seeing through or inside of objects, or any other suitable sensors. In addition, instruments 112, 204 can include tools, non-limiting examples of which include, a projectile launcher, a liquid sprayer, an air blower, a flame thrower, a heat projector, a cold projector, a scent projector, a chemical projector, an electric discharge device, a fire extinguisher, a laser, or any other suitable tools to perform any task. Additionally, instruments 112, 204 can include a display screen, a video projector, an audio speaker, or any other suitable instrument. It is to be appreciated that horticulture light 100, 200 can have configurable instruments. For example, horticulture light 100, 200 can have a modular configuration that allows for one or more instruments to be added or removed by a manufacturer or operator.

A horticulture light 100, 200 can be constructed out of any suitable material appropriate for environments in which the horticulture light 100, 200 will operate. A horticulture light 100, 200 can have suitable protection against an environment in which the horticulture light 100, 200 will operate, non-limiting examples of which include weather resistant, crush resistant, fire resistant, heat resistant, cold resistant, pressure resistant, impact resistant, liquid and/or solid material ingress protection, chemical resistant, corrosion resistant, shatter resistant, scratch resistant, bio-contamination resistant, electromagnetic pulse resistant, electrical shock resistant, projectile resistant, explosion resistant, or any other suitable resistance for an environment in which the horticulture light 100, 200 will operate.

The computer processing systems, computer-implemented methods, apparatus and/or computer program products of horticulture light 100, 200 employ hardware and/or software to solve problems that are highly technical in nature (e.g., related to complex coordination of one or more horticulture lights 100, 200 possibly with other device to perform self-configuration of the one or more horticulture lights 100, 200) that are not abstract and that cannot be performed as a set of mental acts by a human. One or more embodiments of the subject computer processing systems, methods, apparatuses and/or computer program products enable one or more horticulture lights 100, 200 to coordinate amongst themselves, and optionally with other devices, to perform actions to understand the environment in which the one or more horticulture lights 100, 200 is installed, determine an objective of the installation, perform a self-configuration according to the determined objective, and operate to achieve the determined objective. For example, the horticulture lights 100, 200 can employ artificial intelligence to learn their environment, and learn actions to perform to self-configure and operate for a determined objective of the installation in the environment.

Figure 5:
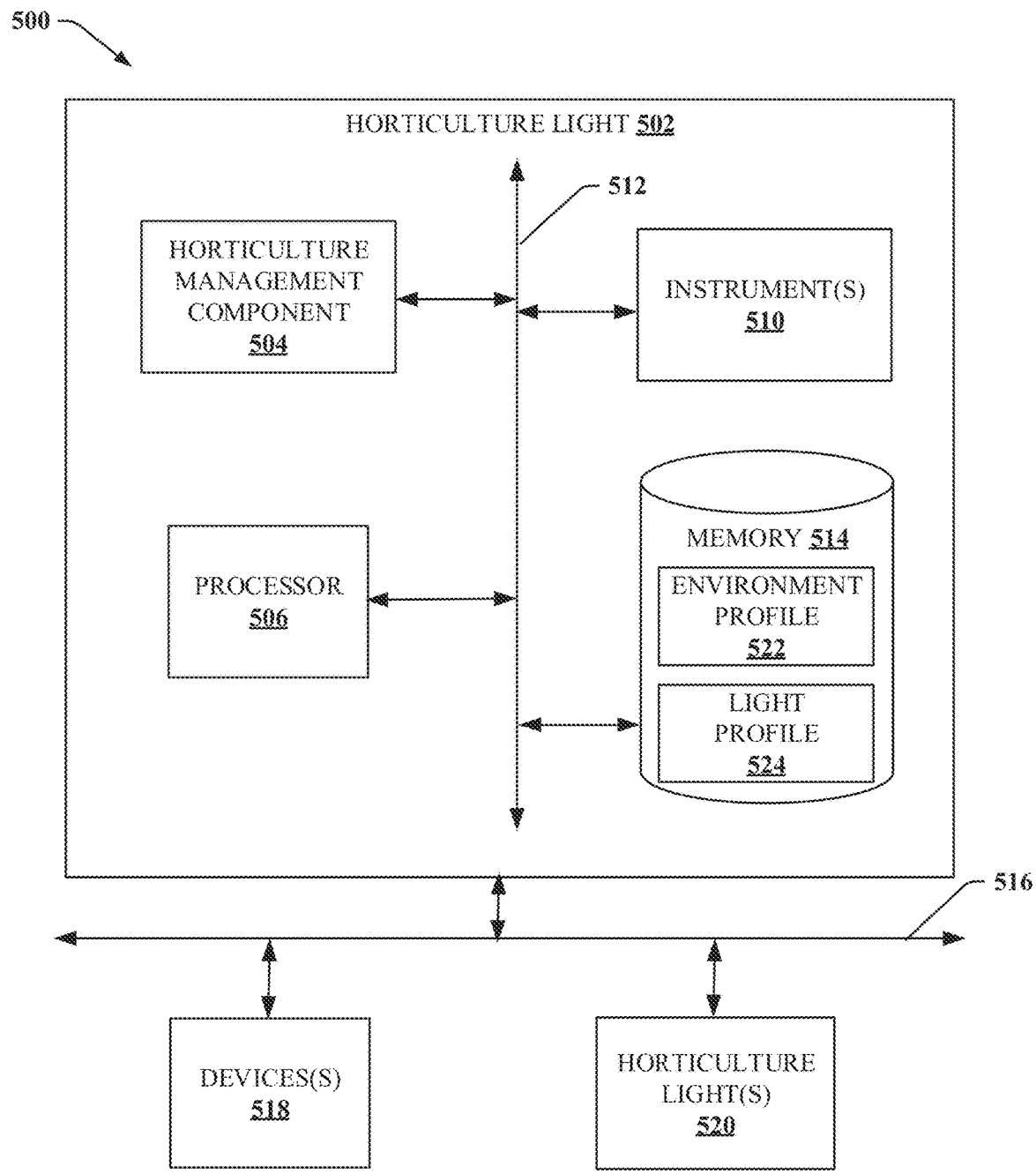
FIG. 5 illustrates a block diagram of an example, non-limiting horticulture light in accordance with one or more embodiments described herein.

FIG. 5 illustrates a block diagram of an example, non-limiting system 500 that facilitates a horticulture light 502 to understand the environment in which the horticulture light 502 is installed, determine an objective of the installation, perform a self-configuration according to a determined objective, and operate to achieve the determined objective related to efficiently enhancing plant growth in accordance with one or more embodiments described herein. Repetitive description of like elements employed in other embodiments described herein is omitted for sake of brevity.

In some embodiments, the system 500 facilitates a plurality of horticulture lights 502, 520 coordinating together to understand the environment in which the horticulture lights 502, 520 are installed, determine an objective of the installation, perform a self-configuration related to efficiently enhancing plant growth according to the determined objective, and operate to achieve the determined objective in accordance with one or more embodiments described herein. Aspects of systems (e.g., system 500 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., one or more computers, one or more computing devices, one or more virtual machines, etc., can cause the one or more machines to perform the operations described.

As shown in FIG. 5, the system 500 can include horticulture lights 502, 520, one or more networks 516, and one or more devices 518. In various embodiments, horticulture lights 502, 520 can be or include the structure and/or functionality of one or more of horticulture lights 100 or 200 and/or any other structure and/or functionality described herein for horticulture lights. In one example, horticulture light 502 can be a different type of horticulture light than horticulture light 520. In another example, a horticulture light 520 can be a horticulture light 502 and/or include one or more components of horticulture light 502. It is to be appreciated that in disclosure herein in which more than one horticulture light is employed, the horticulture lights can include one or more horticulture light 502 and/or one or more horticulture light 520.

Horticulture light 502 can include instruments 510, which can include or be one or more of numerous different types of instruments 112, 204 disclosed herein. Horticulture light 502 can communicate with other horticulture lights 520 and devices 518 over one or more networks 516 via wireless and/or wired communications using instruments 510. Horticulture light 502 can include horticulture management component 504 that can enable horticulture light 502 to understand the environment in which the horticulture light 502 is installed, determine an objective of the installation, perform a self-configuration according to the determined objective, and operate to achieve the determined objective related to efficiently enhancing plant growth.

Horticulture light 502 can include or otherwise be associated with at least one memory 514 that can store computer executable components (e.g., computer executable components can include, but are not limited to, the horticulture management component 504, and/or associated components) and can store any data generated or obtained by horticulture light 502 and associated components. Memory 514 can store an environment profile 522 that describes characteristics of an environment in which horticulture light 502 is installed. Memory 514 can store a light profile 524 that can include environment profile 522, and capabilities and configuration of horticulture light 502. Horticulture light 502 can also include or otherwise be associated with at least one processor 506 that executes the computer executable components stored in the memory 514. Horticulture light 502 can further include a system bus 512 that can couple the various components including, but not limited to, horticulture management component 504, instruments 510, memory 514, processor 506, and/or other components.

Device 518 can be any electronic device that can electronically interact (e.g. unidirectional interaction or bidirectional interaction) with horticulture light 502, non-limiting examples of which can include a wearable electronic device or a non-wearable electronic device. It is to be appreciated that interaction can include in a non-limiting example, communication, control, physical interaction, or any other suitable interaction between devices. Wearable device can include, for example, heads-up display glasses, a monocle, eyeglasses, contact lens, sunglasses, a headset, a visor, a cap, a mask, a headband, clothing, or any other suitable device that can be worn by a human or non-human user that comprises electronic components. Non-wearable devices can include, for example, a system (e.g. temperature, humidity, watering, fertilizing, feeding, pollination, insect repellent, sound, air flow, air quality, windows, robots, or any other suitable systems associated with horticulture), a mobile device, a mobile phone, a camera, a camcorder, a video camera, laptop computer, tablet device, desktop computer, server system, cable set top box, satellite set top box, cable modem, television set, monitor, media extender device, blu-ray device, DVD (digital versatile disc or digital video disc) device, compact disc device, video game system, portable video game console, audio/video receiver, radio device, portable music player, navigation system, car stereo, a mainframe computer, a robotic device, an artificial intelligence system, a home automation system, a security system, a messaging system, a presentation system, a sound system, a warning system, a fire suppression system, a lighting system, a network storage device, a communication device, a web server device, a network switching device, a network routing device, a gateway device, a network hub device, a network bridge device, a control system, or any other suitable device. Device 518 can be equipped with a communication device that enables device 518 to communicate with horticulture light 502 and/or 520 over network 516. It is to be appreciated that a device 518 can be employed by an operator to interact with a horticulture light 502 and/or 520.

The various components (e.g., horticulture management component 504, instruments 510, memory 514, processor 506, horticulture lights 502, 520, and/or other components) of system 500 can be connected either directly or via one or more networks 516. Such networks 516 can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, electromagnetic induction communication, or any other suitable communication technology.

Figure 6:
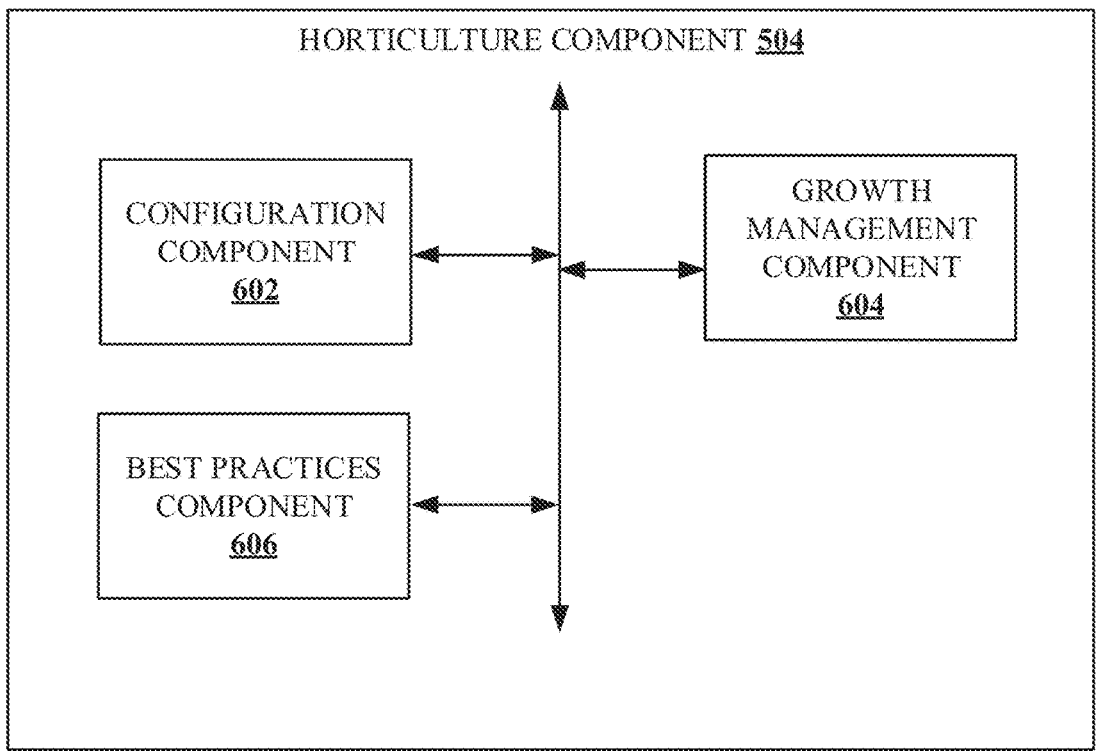
FIG. 6 illustrates a block diagram of an example, non-limiting horticulture component in accordance with one or more embodiments described herein.

FIG. 6 illustrates a block diagram of an example, non-limiting horticulture management component 504 that can facilitate horticulture light 502 to determine (e.g., ascertain, infer, calculate, predict, prognose, estimate, derive, forecast, detect, and/or compute) characteristics of the horticulture environment in which the horticulture light 502 is installed, determine capabilities of horticulture light 502, determine one or more objectives of the installation of horticulture light 502, perform a self-configuration of horticulture light 502 according to the determined one or more objectives, and determine and execute suitable actions for horticulture light 502 to perform to achieve the determined one or more objectives in accordance with one or more embodiments described herein. Repetitive description of like elements employed in other embodiments described herein is omitted for sake of brevity.

Horticulture management component 504 can include configuration component 602 that can determine characteristics (e.g. plant characteristics, environmental characteristics, resource characteristics, or any other suitable characteristics) of a horticulture environment in which the horticulture light 502 is installed, determine capabilities of horticulture light 502, determine one or more objectives of the installation of horticulture light 502, and perform a self-configuration of horticulture light 502 according to the determined one or more objectives. Horticulture management component 504 can also include growth management component 604 that can monitor plant characteristics of plants in the horticulture environment, environmental characteristics of the horticulture environment, and resource characteristics of resources of the horticulture environment, and determine and execute suitable actions for horticulture light 502 to perform to achieve the determined one or more objectives. Horticulture management component 504 can also include best practices component 606 that can learn best practices for efficiently enhancing growth of plants in the horticulture environment.

Configuration component 602 can employ one or more instruments 510 to obtain information about the environment in which the horticulture light 502 is installed and determine the characteristics of the horticulture environment. In a non-limiting embodiment, characteristics can include information about objects, devices, people, flora, fauna, predators, pests, colors, scents, biohazards, chemicals, dimensional characteristics, health status, locations, topography, landscape, seascape, boundaries, atmosphere, manmade features, furniture, toys, equipment, machines, vehicles, buildings, grounds, roads, water features, rocks, trees, debris, geographic features, unsafe conditions, weather conditions, property line boundary, ground conditions, water conditions, atmospheric conditions, water currents, air currents, water salinity, air temperature, water temperature, ground temperature, ground traction, network topology, or any other suitable characteristics of the environment that can be determined from information obtained by instruments 510.

It is to be appreciated that configuration component 602 can employ intelligent recognition techniques (e.g., spatial relationship recognition, pattern recognition, object recognition, facial recognition, animal recognition, pose recognition, action recognition, shape recognition, scene recognition, behavior recognition, sound recognition, scent recognition, voice recognition, audio recognition, image recognition, motion recognition, hue recognition, feature recognition, edge recognition, texture recognition, timing recognition, location recognition, and/or any other suitable recognition technique) to determine characteristics based on information obtained by one or more instruments 510.

Configuration component 602 can employ one or more sensors as described above to obtain physical information about the physical environment in which horticulture light 502 is installed. In an example, configuration component 602 can employ a camera to obtain visual information about the horticulture environment. In another example, configuration component 602 can employ a microphone to obtain audio information about the horticulture environment. In a further example, configuration component 602 can employ a GPS device to obtain location of the horticulture light 502 in the horticulture environment. In another example, configuration component 602 can employ an LIDAR sensor to obtain mapping information about the horticulture environment. In an additional example, configuration component 602 can employ GPS device and LIDAR sensor to map the locations of characteristics recognized in the horticulture environment. It is to be appreciated that configuration component 602 can employ any suitable instrument to obtain corresponding information produced by the instrument about the physical environment.

Configuration component 602 can also employ one or more instruments as described above to obtain information about the network environment in which horticulture light 502 is installed. In an example, configuration component 602 can employ a communication device to discover communication networks operating in the environment. Configuration component 602 can connect to one or more of the networks using suitable security and authentication schemes and obtain device information about devices 518 and/or horticulture lights 520 operating on the networks. In a non-limiting example, device information can comprise device type, device model number, device location, device functionality, device configuration, device security, communication protocols supported, or any other suitable attribute of a device 518. It is to be appreciated that configuration component 602 can employ suitable security techniques to prevent unauthorized access to horticulture light 502 while obtaining device information on other devices 118 on the one or more networks. Configuration component 602 can determine what security and/or communication protocols it should employ and self-configure for operation using the appropriate security and/or communication protocols.

Configuration component 602 can create an environment profile 522 that describes the characteristics of the horticulture environment in which horticulture light 502 is installed based on the physical information and the device information obtained by the one or more instruments 510. For example, configuration component 602 can employ intelligent recognition techniques to recognize characteristics of the environment based on the physical information and the device information. In an additional example, configuration component 602 can associate device information obtained from devices 518 with corresponding physical information associated with the devices 518 obtained from sensors. Configuration component 602 can also employ knowledge resources (e.g., internet, libraries, encyclopedias, databases, devices 518, or any other suitable knowledge resources) to obtain detailed information describing the characteristics. For example, configuration component 602 can obtain detailed product information related to recognized characteristics of the environment. In another example, configuration component 602 can obtain risk information related to recognized characteristics of the environment. In a further example, configuration component 602 can obtain information describing interaction between various recognized characteristics of the environment. Configuration component 602 can obtain any suitable information associated with recognized characteristics of the environment from any suitable knowledge resource.

Furthermore, configuration component 602 can generate a confidence metric indicative of a confidence of a determination of a characteristic that has been made by configuration component 602 based on any suitable function. For example, configuration component 602 can employ the multiple sources of information (e.g., physical information, device information, and information from knowledge sources) and perform a cross-check validation across the various sources to generate a confidence metric indicative of a confidence of an accuracy of a determination of a characteristic.

Configuration component 602 can employ the characteristics and any associated obtained information to generate an environment profile 522 that describes the characteristics of the environment. The environment profile 522 can be organized in any suitable manner, non-limiting examples of which include an array, a table, a tree, a map, graph, a chart, a list, network topology, or any other suitable manner of organizing data in a profile. In a non-limiting example, environment profile 522 can include respective entries for each characteristic of the environment that comprise a detailed description of the characteristic, a location of the characteristic in the environment, tracking information describing changes to the characteristic over time, source used to determine the characteristic, confidence of accuracy of the determined characteristic, or any other suitable information associated with the characteristic. Environment profile 522 can include a map of the environment identifying characteristics and their locations on the map.

Figure 8:
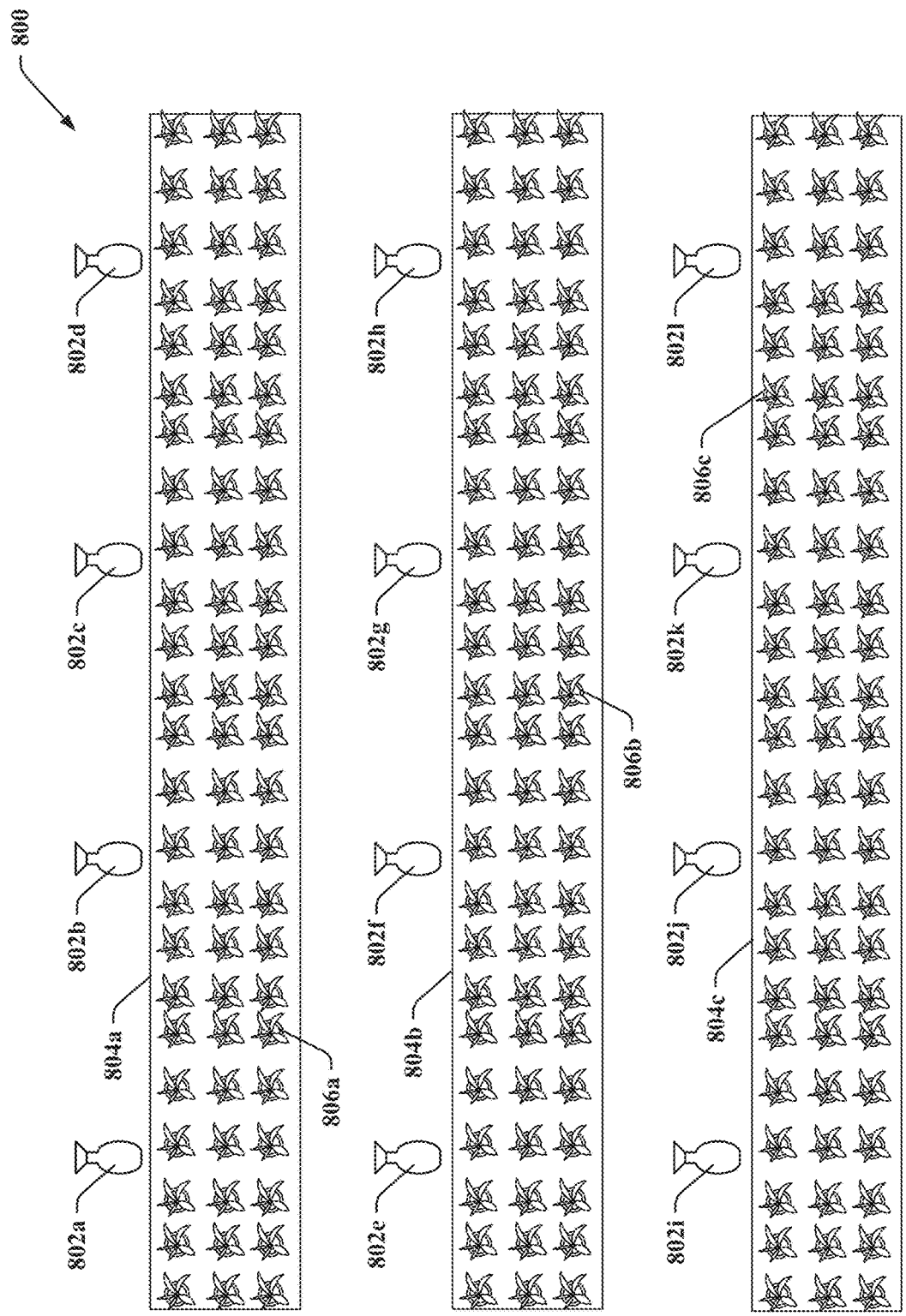
FIG. 8 illustrates a block diagram of an example, non-limiting horticulture environment in which horticulture lights are installed in accordance with one or more embodiments described herein.

FIG. 8 illustrates a block diagram of an example, non-limiting horticulture environment 800 in which horticulture lights are installed in accordance with one or more embodiments described herein. For exemplary purposes only, horticulture environment 800 is depicted as a grow room with rows of plants. It is to be appreciated that horticulture lights can be installed in any suitable horticulture environment as discussed above. Repetitive description of like elements employed in other embodiments described herein is omitted for sake of brevity.

Horticulture environment 800 has installed horticulture lights 802*a*, 802*b*, 802*c*, 802*d*, 802*e*, 802*f*, 802*g*, 802*h*, 802*i*, 802*j*, 802*k*, and 802*l*, which can respectively be or include portions of horticulture light 502. While FIG. 8 depicts twelve horticulture lights 502 for exemplary purposes, it is to be appreciated that any suitable quantity of horticulture lights 502 can be installed in a horticulture environment.

One or more of horticulture lights 802*a*, 802*b*, 802*c*, 802*d*, 802*e*, 802*f*, 802*g*, 802*h*, 802*i*, 802*j*, 802*k*, or 802*l* can employ instruments 510 to determine characteristics of the horticulture environment 800. For example, one or more of horticulture lights 802*a*, 802*b*, 802*c*, 802*d*, 802*e*, 802*f*, 802*g*, 802*h*, 802*i*, 802*j*, 802*k*, or 802*l* can employ sensors to obtain physical information and recognize characteristics, such as each other horticulture light, planting areas 804*a*, 804*b*, 804*c*, and plants in the planting areas, such as plants 806*a*, 806*b*, and 806*c* (only one plant in each planting area is labeled for ease of viewing, however each of the plants individually can be recognized by the horticulture lights). In a further example, one or more of horticulture lights 802*a*, 802*b*, 802*c*, 802*d*, 802*e*, 802*f*, 802*g*, 802*h*, 802*i*, 802*j*, 802*k*, or 802*l* can determine plant characteristics, environmental characteristics, resource characteristics, lighting conditions at various times of the day, usage of resource characteristics over time, dimensional information of the characteristics, locations of characteristics, changes to characteristics over time, or any other suitable physical information that can be obtained from sensors. In another example, one or more of horticulture lights 802*a*, 802*b*, 802*c*, 802*d*, 802*e*, 802*f*, 802*g*, 802*h*, 802*i*, 802*j*, 802*k*, or 802*l* can employ communication devices to determine and establish communications on networks (e.g. Wi-Fi, automation, etc.) on which devices are communicating and obtain device information from devices. One or more of horticulture lights 802*a*, 802*b*, 802*c*, 802*d*, 802*e*, 802*f*, 802*g*, 802*h*, 802*i*, 802*j*, 802*k*, or 802*l* can communicate with each other to obtain information about horticulture environment 800 that those horticulture lights have determined.

Figure 9:
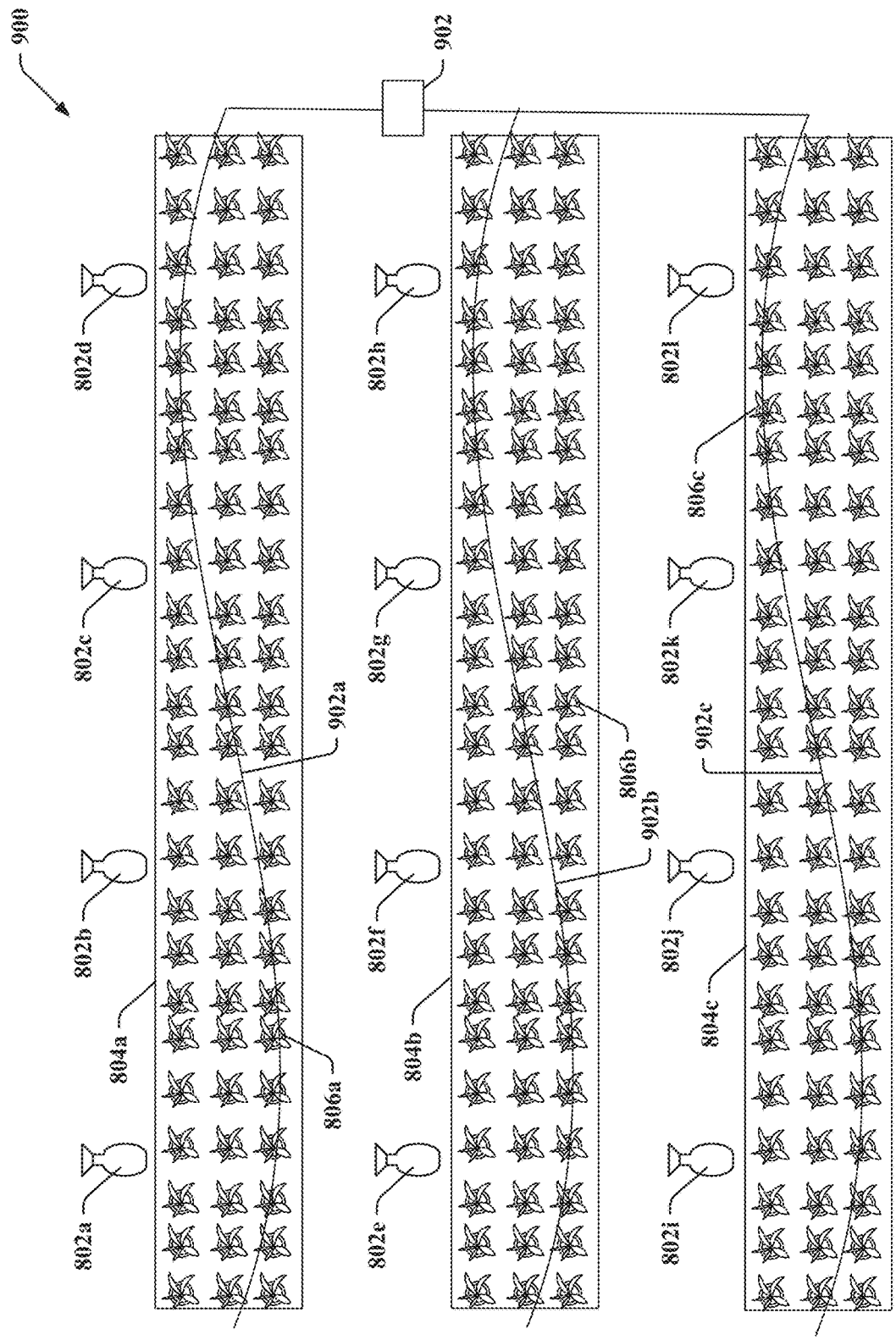
FIG. 9 illustrates a block diagram of an example, non-limiting horticulture environment in which horticulture lights are installed in accordance with one or more embodiments described herein.

FIG. 9 illustrates a block diagram of an example, non-limiting horticulture environment 900 in which horticulture lights are installed in accordance with one or more embodiments described herein. Horticulture environment 900 is based on horticulture environment 800 with the addition of resources. Repetitive description of like elements employed in other embodiments described herein is omitted for sake of brevity.

One or more of horticulture lights 802*a*, 802*b*, 802*c*, 802*d*, 802*e*, 802*f*, 802*g*, 802*h*, 802*i*, 802*j*, 802*k*, or 802*l* can employ instruments 510 to determine resource characteristics of the horticulture environment 900. For example, one or more of horticulture lights 802*a*, 802*b*, 802*c*, 802*d*, 802*e*, 802*f*, 802*g*, 802*h*, 802*i*, 802*j*, 802*k*, or 802*l* can employ sensors to identify watering system 902 with watering lines 902*a*, 902*b*, and 902*c* over planting areas 804*a*, 804*b*, 804*c*. One or more of horticulture lights 802*a*, 802*b*, 802*c*, 802*d*, 802*e*, 802*f*, 802*g*, 802*h*, 802*i*, 802*j*, 802*k*, or 802*l* can employ communication devices to determine and establish communications on a network on which watering system 902 is communicating and obtain device information about watering system 902. Furthermore, one or more of horticulture lights 802*a*, 802*b*, 802*c*, 802*d*, 802*e*, 802*f*, 802*g*, 802*h*, 802*i*, 802*j*, 802*k*, or 802*l* can establish control of watering system 902. For example, horticulture light 802*h* being closest to watering system 902 can take control of watering system 902 and coordinate with one or more of horticulture lights 802*a*, 802*b*, 802*c*, 802*d*, 802*e*, 802*f*, 802*g*, 802*i*, 802*j*, 802*k*, or 802*l* to make decisions regarding control of watering system 902. In another example, horticulture light 802*d* can take control of watering system 902 with respect to water line 902*a* and coordinate with one or more of horticulture lights 802*a*, 802*b*, or 802*c*, to make decisions regarding control of water line 902*a*, horticulture light 802*h* can take control of watering system 902 with respect to water line 902*b* and coordinate with one or more of horticulture lights 802*e*, 802*f*, and 802*g*, to make decisions regarding control of water line 902*b*, and horticulture light 802*l* can take control of watering system 902 with respect to water line 902*c* and coordinate with one or more of horticulture lights 802*i*, 802*j*, and 802*k*, to make decisions regarding control of water line 902*c*. It is to be appreciated that any of one or more horticulture lights 802*a*, 802*b*, 802*c*, 802*d*, 802*e*, 802*f*, 802*g*, 802*h*, 802*i*, 802*j*, 802*k*, or 802*l* can control any suitable controllable portion of watering system 902. This advantageously allows for more granular control of the watering system based on the specific characteristics of each planting area 804*a*, 804*b*, and 804*c*. For example, respective planting areas 804*a*, 804*b*, and 804*c* can have different types of plants, plants at different stages of growth, or any other suitable different characteristic. While a resource of a watering system is depicted for exemplary purposes only, it is to be appreciated with a horticulture light can identify, communicate with, and/or control any suitable resource of a horticulture environment.

Figure 10:
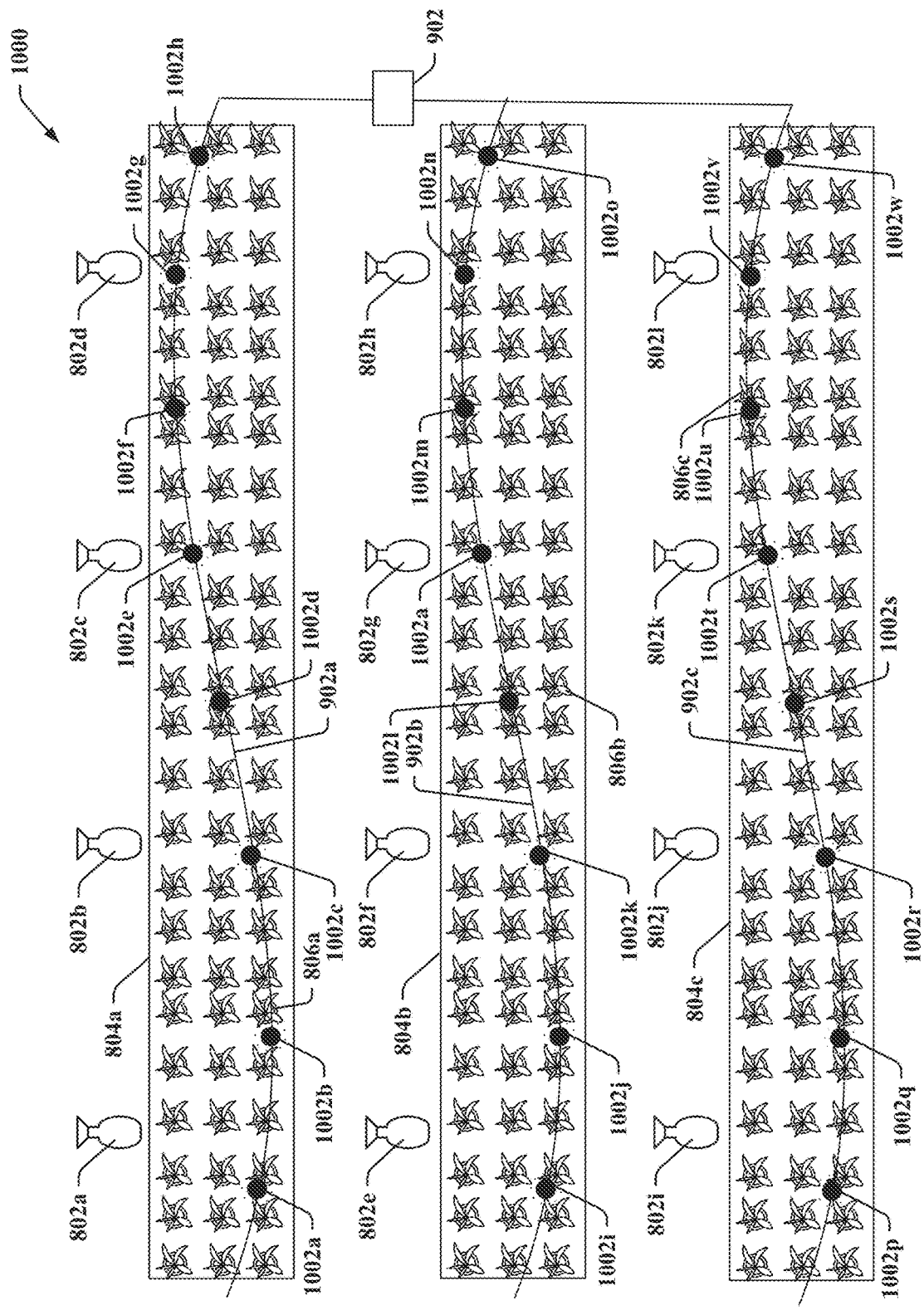
FIG. 10 illustrates a block diagram of an example, non-limiting horticulture environment in which horticulture lights are installed in accordance with one or more embodiments described herein.

FIG. 10 illustrates a block diagram of an example, non-limiting horticulture environment 1000 in which horticulture lights are installed in accordance with one or more embodiments described herein. Horticulture environment 1000 is based on horticulture environment 900 with the addition of resources. Repetitive description of like elements employed in other embodiments described herein is omitted for sake of brevity.

One or more of horticulture lights 802*a*, 802*b*, 802*c*, 802*d*, 802*e*, 802*f*, 802*g*, 802*h*, 802*i*, 802*j*, 802*k*, or 802*l* can employ instruments 510 to determine resource characteristics of the horticulture environment 900. For example, one or more of horticulture lights 802*a*, 802*b*, 802*c*, 802*d*, 802*e*, 802*f*, 802*g*, 802*h*, 802*i*, 802*j*, 802*k*, or 802*l* can employ sensors to identify watering system 902 with watering lines 902*a*, 902*b*, and 902*c* over planting areas 804*a*, 804*b*, 804*c*. Furthermore, one or more of horticulture lights 802*a*, 802*b*, 802*c*, 802*d*, 802*e*, 802*f*, 802*g*, 802*h*, 802*i*, 802*j*, 802*k*, or 802*l* can recognize combination feeder/water spray heads 1002*a*, 1002*b*, 1002*c*, 1002*d*, 1002*e*, 1002*f*, 1002*g*, 1002*h*, 1002*i*, 1002*j*, 1002*k*, 1002*l*, 1002*m*, 1002*n*, 1002*o*, 1002*p*, 1002*q*, 1002*r*, 1002*s*, 1002*t*, 1002*u*, 1002*v*, and 1002*w*. In a non-limiting example, horticulture lights 802*a*, 802*b*, 802*c*, 802*d*, 802*e*, 802*f*, 802*g*, 802*h*, 802*i*, 802*j*, 802*k*, or 802*l* can coordinate to determine which combination feeder/water spray heads are controlled by which horticulture lights. For example, a horticulture light monitoring plants within a defined region of a combination feeder/water spray head can control the combination feeder/water spray head. In a non-limiting example, horticulture light 802*a* can control combination feeder/water spray head 1002*a*, while horticulture light 802*b* controls combination feeder/water spray head 1002*c*. In another example, horticulture light 802*a* and horticulture light 802*b* share control of combination feeder/water spray head 1002*a*. In a further example, horticulture light 802*a* and horticulture light 802*b* can negotiate with each other to determine control of combination feeder/water spray head 1002*a*. In a further example, horticulture lights 802*a*, 802*b*, 802*c*, 802*d*, 802*e*, 802*f*, 802*g*, 802*h*, 802*i*, 802*j*, 802*k*, or 802*l* can receive instructions from an operator or other device defining which combination feeder/water spray heads are controlled by which horticulture lights. It is to be appreciated that determination of which combination feeder/water spray heads are controlled by which horticulture lights can be made based on an objective of the horticulture environment or by any other suitable decision-making mechanism. This advantageously allows for more granular control of the feeding/watering system based on the specific characteristics of respective portions of planting areas 804*a*, 804*b*, and 804*c*. For example, respective portions of planting areas can have different types of plants, plants at different stages of growth, or any other suitable different characteristic. While a resource of a combination feeding/watering system is depicted for exemplary purposes only, it is to be appreciated with a horticulture light can identify, communicate with, and/or control any suitable resource of a horticulture environment.

One or more of horticulture lights 802a, 802b, 802c, 802d, 802e, 802f, 802g, 802h, 802i, 802j, 802k, or 802l can employ communication devices to determine and establish communications on a network on which watering system 902 is communicating and obtain device information about watering system 902. Furthermore, one or more of horticulture lights 802a, 802b, 802c, 802d, 802e, 802f, 802g, 802h, 802i, 802j, 802k, or 802l can establish control of watering system 902. For example, horticulture light 802h being closest to watering system 902 can take control of watering system 902 and coordinate with one or more of horticulture lights 802a, 802b, 802c, 802d, 802e, 802f, 802g, 802i, 802j, 802k, or 802l to make decisions regarding control of watering system 902. In another example, horticulture light 802d can take control of watering system 902 with respect to water line 902a and coordinate with one or more of horticulture lights 802a, 802b, or 802c, to make decisions regarding control of water line 902a, horticulture light 802h can take control of watering system 902 with respect to water line 902b and coordinate with one or more of horticulture lights 802e, 802f, and 802g, to make decisions regarding control of water line 902b, and horticulture light 802l can take control of watering system 902 with respect to water line 902c and coordinate with one or more of horticulture lights 802i, 802j, and 802k, to make decisions regarding control of water line 902c. It is to be appreciated that any of one or more horticulture lights 802a, 802b, 802c, 802d, 802e, 802f, 802g, 802h, 802i, 802j, 802k, or 802l can control any suitable controllable portion of watering system 902, While a resource of a watering system is depicted for exemplary purposes only, it is to be appreciated with a horticulture light can communicate with and/or control any suitable resource of a horticulture environment.

Referring back to FIG. 6, configuration component 602 that can perform a self-examination to determine capabilities of horticulture light 502. For example, configuration component 602 can determine capabilities, such as in a non-limiting example, power sources, computers, processors 506, memories 514, programs, instruments 112, 204, or any other suitable capability of horticulture light 502. In an example, configuration component 602 can probe system bus 512 to determine capabilities of horticulture light 502. In another example, configuration component 602 can examine memory 514 for information on capabilities of horticulture light 502. In a further example, configuration component 602 can obtain information on capabilities of horticulture light 502 from one or more knowledge sources. It is to be appreciated that configuration component 602 can employ any suitable mechanism to determine capabilities of horticulture light 502.

Configuration component 602 can also determine one or more objectives of the installation of horticulture light 502. For example, configuration component 602 can employ artificial intelligence to determine an objective of the installation of horticulture light 502 based on environment profile 522 and determined capabilities of horticulture light 502. In a non-limiting example, an objective can be related to maximizing plant growth, maximizing fruit bearing, maximizing profits, minimizing energy usage, achieving a defined plant characteristic, balancing resource usage versus plant growth according to a defined criterion, safety, automation, control, communication, instruction, economics, notification, coordination, monitoring, intervention, time management, workflow management, protecting the environment, or any other suitable objective related to efficiently enhancing plant growth. For example, an objective can be to maximize profits from growing plant, such as by obtaining information related to costs of resources and selling prices for plants and/or part of plants. In another example, an objective can be to minimize usage of chemicals. In a further example, an objective can be to maximize yield of saleable parts of plants. In an additional example, an objective can be to produce plants with defined plant characteristics (e.g. size, color, shape, or any other suitable plant characteristic). In another example, an objective can be to balance one or more criterion according to a utility analysis (e.g. cost versus benefit). Furthermore, a plurality of horticulture lights 502 can coordinate to determine common objectives. It is to be appreciated that any suitable objective can be determined for the horticulture environment.

In an example, configuration component 602 can select objectives from a library of objectives stored in memory 514 or in one or more knowledges sources. In another example, configuration component 602 can create objectives based on artificial intelligence. In a further example, configuration component 602 can create linked objectives, wherein one or more objectives depends on one or more other objectives. For example, an objective can become active if another objective is achieved. In another example, an objective can become inactive if another objective is achieved. It is to be appreciated that configuration component 602 can employ any suitable mechanism to determine objectives of horticulture light 502. In a further example, objectives can be defined by an operator.

Configuration component 602 can also generate a light profile 524 for horticulture light 502 according to the determined one or more objectives. Light profile 524 can comprise environment profile 522 for horticulture light 502, capabilities of horticulture light 502, and objectives of horticulture light 502. Light profile 524 can be organized in any suitable manner, non-limiting examples of which include an array, a table, a tree, a map, graph, a chart, a list, topology, or any other suitable manner of organizing data in a profile. In a non-limiting example, light profile 524 can include respective entries for each objective that comprise a detailed description of the objective, success metrics for the objective, tracking information describing changes to the objective over time, source used to determine the objective, confidence of accuracy of the determined objective, or any other suitable information associated with the objective. Furthermore, configuration component 602 can configure settings of one or more parameters of horticulture light 502 (e.g., of processors, memory, programs, instruments 510, horticulture light bulb 102, horticulture light fixture 202, housing 106, lens 110, light emitting devices, base 108, socket 116, or any other suitable parameters of components of horticulture lights 502) to achieve the one or more objectives, and store the settings in light profile 524.

Figure 7:
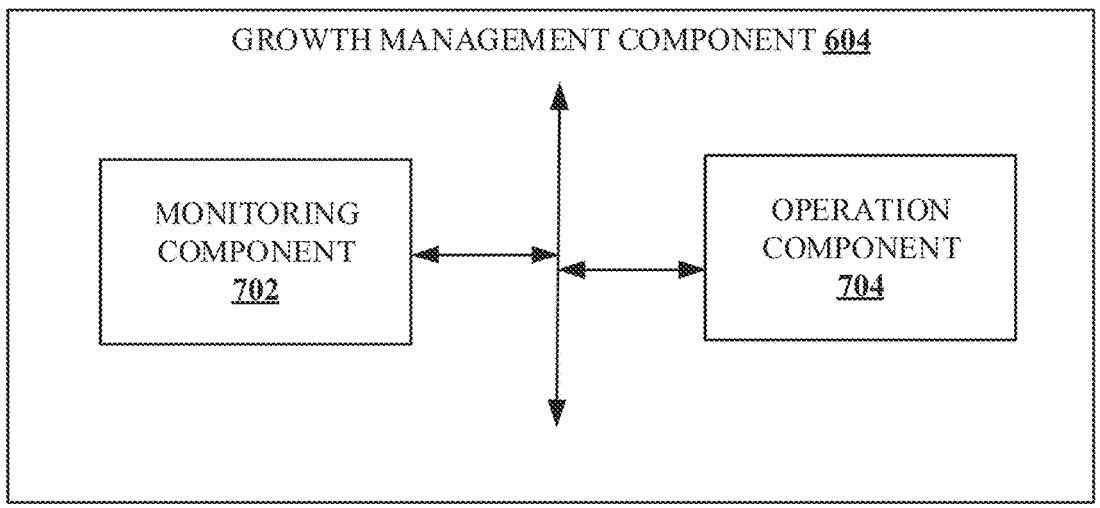
FIG. 7 illustrate a block diagram of an example, non-limiting growth management component in accordance with one or more embodiments described herein.

FIG. 7 illustrates a block diagram of an example, non-limiting growth management component 604 that can monitor the horticulture environment, and determine and execute suitable actions for horticulture light 502 to perform to achieve the determined one or more objectives in accordance with one or more embodiments described herein. Repetitive description of like elements employed in other embodiments described herein is omitted for sake of brevity.

Growth management component 604 can include monitoring component 702 that can employ instruments 510 to monitor characteristics of the horticulture environment, such as in a non-limiting example, for plant characteristics (e.g. type of plant, stage of growth, health, disease, pest infestation, or any other suitable characteristics associated with the plants) of plants in the horticulture environment, environmental characteristics (e.g. temperature, humidity, ambient lighting, air quality, water quality, soil quality, soil moisture, pests, location, location relative to other plants, ambient sounds, or any other suitable characteristic associated with a horticulture environment) of the horticulture environment, and resource characteristics (e.g. type of resource, state of resource, resource schedule, availability of resource, resource usage, or any other suitable characteristics associated with the resources) of resources of the horticulture environment. For example, monitoring component 702 can monitor plants to determine their current plant characteristics and/or track how their plant characteristics change over time.

In another example, monitoring component 702 can monitor the horticulture environment to determine current environmental characteristics and/or track how the environmental characteristics change over time. In another example, monitoring component can predict future environmental characteristics based on current or historical environmental characteristics of the horticulture environment.

In a further example, monitoring component 702 can monitor the horticulture environment to determine current resource characteristics and/or track how the resource characteristics change over time. For example, monitoring component 702 can monitor usage and/or availability of systems for lighting, water, electrical power, fertilizer, feed, chemicals, insecticides, heating, ventilation, and air conditioning (HVAC), or any other suitable resource of a horticulture environment. In another example, monitoring component can predict future resource characteristics based on current or historical resource characteristics of the horticulture environment.

In an additional example, monitoring component can predict future plant characteristics based on current and/or historical plant characteristics of the horticulture environment, current and/or predicted environmental characteristics of the horticulture environment, and/or current and/or predicted resource characteristics of the horticulture environment.

It is to be appreciated that monitoring component 702 can employ any instruments 510 to monitor any characteristic of the horticulture environment.

Growth management component 604 can include operation component 704 that can employ the monitored characteristics of the horticulture environment to determine and execute suitable actions for horticulture light 502 to perform to achieve the determined one or more objectives. For example, operation component 704 can employ artificial intelligence to monitor the horticulture environment for conditions of the characteristics according to the determined one or more objectives using instruments 510, determine one or more suitable actions for horticulture light 502 to perform to achieve the determined one or more objectives based on the conditions of the characteristics and the determined capabilities, and execute the one or more suitable actions. In an example, operation component 704 can select actions from a library of actions stored in memory 514 or in one or more knowledges sources. In another example, operation component 704 can create actions to perform based on artificial intelligence.

For example, operation component 704 can analyze the plant characteristics, environmental characteristics, and resource characteristics, and determine one or more actions to perform to achieve a determined objective. Operation can employ artificial intelligence to determine the one or more actions based on the monitored characteristics, as well as, any other information obtained from any suitable knowledge source related to horticulture. For example, operation component 704 can learn from analyzing past actions performed based on certain monitored characteristics and outcomes from performing those actions to determine levels of success or failure of those actions in accomplishing an objective. Operation component 704 can employ the learning to make decisions regarding one or more actions to perform based on a current set of monitored characteristics of the horticulture environment and an objective.

In another example, operation component 704 can access one or more knowledge sources to determine actions that have successful on other horticulture environments for a set of characteristics of the other horticulture environment to determine one or more actions to perform based on a current set of monitored characteristics of the horticulture environment and an objective.

In a non-limiting example, the actions can relate to customization of light output from horticulture light 502, usage of instruments 510, control of other systems (e.g. temperature, humidity, watering, fertilizing, feeding, pollination, insecticide, fungicide, chemicals, sound, air flow, air quality, windows, robots, sunlight, energy, soil aerator, or any other suitable resource employed in horticulture or any other suitable systems associated with horticulture), sending notifications to operators or devices 118, or any other suitable action that can be performed in a horticulture environment. It is to be appreciated that instruments 510 installed in horticulture light 502 can be capable of performing one or more functions related to horticulture, such as temperature, humidity, watering, fertilizing, feeding, pollination, insecticide, fungicide, chemicals, sound, air flow, air quality, or any other suitable function related to horticulture. In an example, customization of light output from horticulture light 502 can relate to lighting output patterns, hues, light output movements, intensities, spectrum, saturation, light direction, reflection, refraction, dispersion, polarization, on or off interval durations of light output, or any other suitable lighting attribute from one or more horticulture lights 502. It is to be appreciated that specific customizations of light can produce specific effects in plant characteristics, such as in a non-limiting example, plant size, particular plant color, tastes, or aromas, increasing levels of particular plant substances (e.g. THC, antioxidants, oils, pollen, fragrances), regulating plant production of flowers or fruits, or any other suitable plant characteristic that can be influenced by customization of light output. In another example, control of other systems can include control of usage of resources of the systems on the plants and/or in the horticulture environment. It is to be appreciated that operation component 704 can employ any suitable decision-making mechanism to determine one or more actions to perform based on a historical, current, and/or predicted set of monitored characteristics of the horticulture environment and one or more objectives.

In another example, an operator can employ a user interface (not shown) of an application on a device 518 to enter information overriding data in environment profile 522, light profile 524, and/or actions determined by horticulture light 502.

Referring again to FIG. 8, horticulture light 802a can have a defined area of planting area 804a to monitor. Monitoring component 702 of horticulture light 802a can monitor characteristics of the defined area. Monitoring component 702 of horticulture light 802a can also monitor one or more characteristics outside of the defined area that can have an impact on the defined area or an objective. Operation component 704 of horticulture light 802a can customize light output according to the monitored characteristics and one or more objectives. Likewise, horticulture lights 802b, 802c, 802d, 802e, 802f, 802g, 802h, 802i, 802j, 802k, and 802l can have their respective defined areas that they monitor and customize light output. It is to be appreciated that 802a, 802b, 802c, 802d, 802e, 802f, 802g, 802h, 802i, 802j, 802k, and 802l can coordinate their customized light outputs. For example, since light output from a horticulture light may enter a defined area of another horticulture light, the horticulture lights can coordinate one or more parameters of their respective light outputs.

Referring again to FIG. 9, horticulture lights 802a, 802b, 802c, 802d, 802e, 802f, 802g, 802h, 802i, 802j, 802k, and 802l can have their respective defined areas that they monitor and customize light output. In an example, horticulture light 802h can have control of watering system 902. Operation component 704 of horticulture light 802h can obtain monitored characteristics from horticulture lights 802a, 802b, 802c, 802d, 802e, 802f, 802g, 802i, 802j, 802k, and 802l can customize control of watering system 902 according to the monitored characteristics and one or more objectives.

Referring again to FIG. 10, horticulture lights 802a, 802b, 802c, 802d, 802e, 802f, 802g, 802h, 802i, 802j, 802k, and 802l can have their respective defined areas that they monitor and customize light output. Furthermore, horticulture lights 802a can control combination feeder/water spray heads 1002a to manage usage of feed and/or water on plants in its defined area according to the monitored characteristics and one or more objectives. Likewise, horticulture lights 802b, 802c, 802d, 802e, 802f, 802g, 802h, 802i, 802j, 802k, and 802l can have their respective defined areas and respectively control subsets of combination feeder/water spray heads 1002b, 1002c, 1002d, 1002e, 1002f, 1002g, 1002h, 1002i, 1002j, 1002k, 1002l, 1002m, 1002n, 1002o, 1002p, 1002q, 1002r, 1002s, 1002t, 1002u, 1002v, and 1002w to manage usage of feed and/or water on plants in their defined areas according to the monitored characteristics and one or more objectives.

Figure 11:
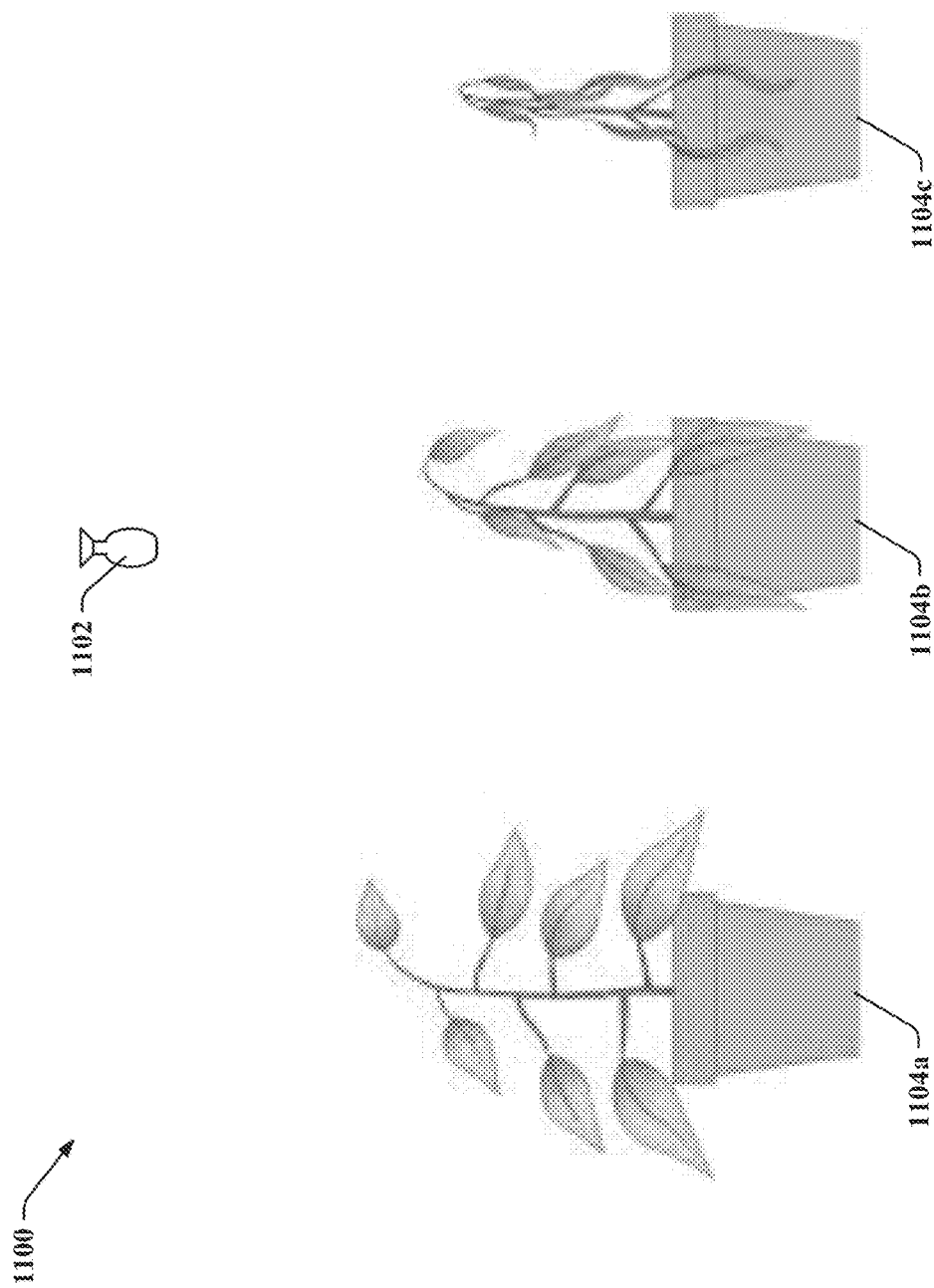
FIG. 11 illustrates a block diagram of an example, non-limiting horticulture environment in which a horticulture light is installed in accordance with one or more embodiments described herein.

FIG. 11 illustrates a block diagram of an example, non-limiting horticulture environment 1100 in which a horticulture light is installed in accordance with one or more embodiments described herein. Repetitive description of like elements employed in other embodiments described herein is omitted for sake of brevity.

Horticulture light 1102 can employ instruments 510 to determine characteristics of the horticulture environment 1100. For example, monitoring component 702 of horticulture light 1102 can monitor plant characteristics of plants 1104a, 1104b, and/or 1104c. Monitoring component 702 can determine that plant 1104a is healthy, and that plants 1104b and 1104c are not healthy and/or have a plant disease. Operation component 704 of horticulture light 1102 can determine that plant 1104b can be treated with one or more actions (e.g. fertilize, feed, fungicide, watering, or any other suitable plant treatment) to improve its health. Operation component 704 of horticulture light 1102 can also determine that plant 1104c is not treatable and risks the health of other plants and takes an action to remove plant 1104c from horticulture environment 1100, such as sending a notification to an operator to remove plant 1104c or controlling a robot to remove plant 1104c. Furthermore, operation component 704 of horticulture light 1102 can also take an action to prevent plant 1104a from contracting a disease from plant 1104b or 1104c, such as applying a preventative treatment on plant 1104a.

FIGS. 12A-12E illustrates block diagram of an example, non-limiting horticulture environment 1200 in which a horticulture light is installed in accordance with one or more embodiments described herein. Repetitive description of like elements employed in other embodiments described herein is omitted for sake of brevity.

Figure 12A:
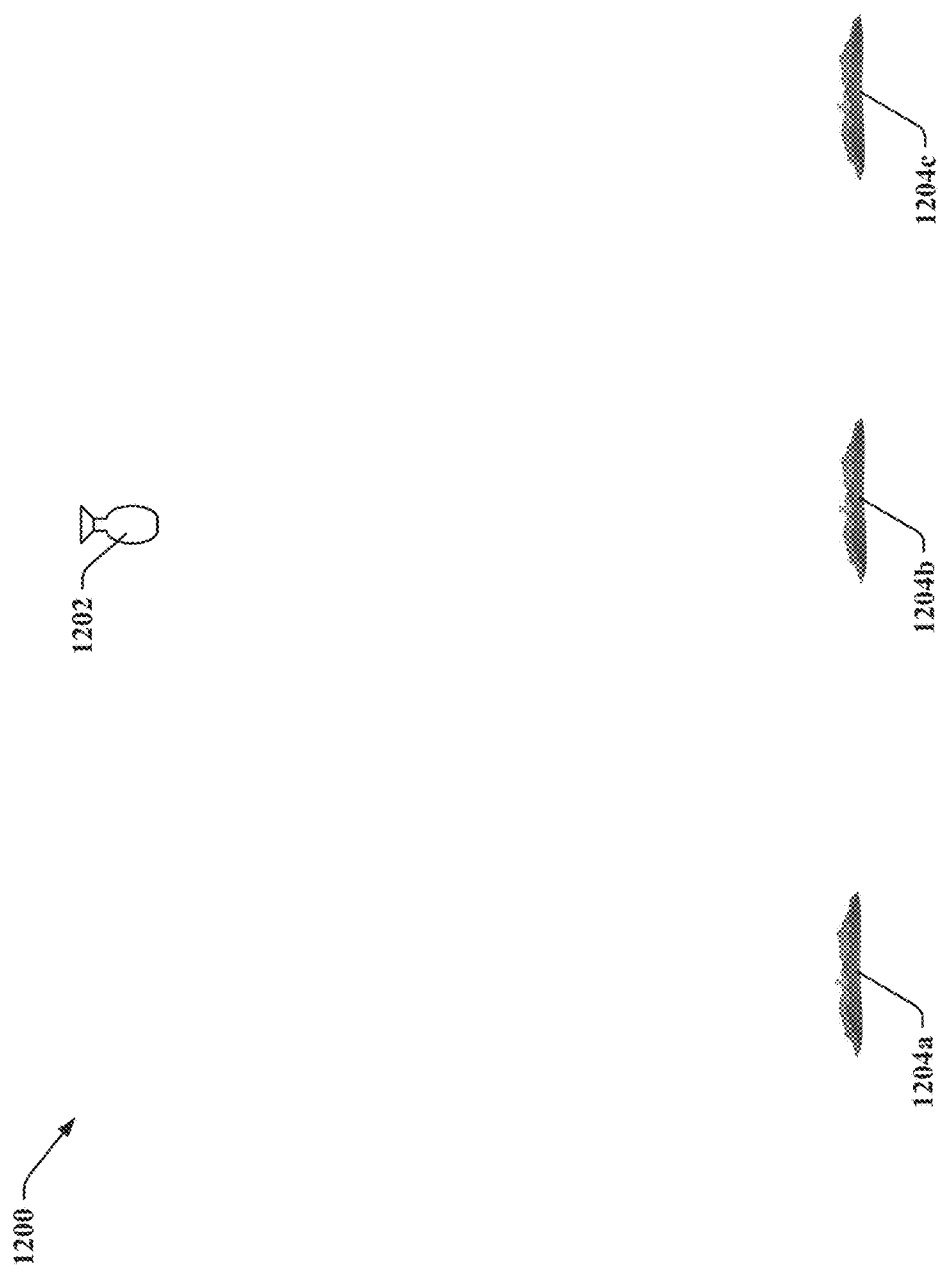

Referring to FIG. 12A. horticulture light 1202 can employ instruments 510 to determine characteristics of the horticulture environment 1200. For example, monitoring component 702 of horticulture light 1202 can monitor plant characteristics of plants 1204a, 1204b, and/or 1204c, and determine that plants 1204a, 1204b, and/or 1204c are at early stage of plant growth, such as a seed stage. Operation component 704 of horticulture light 1202 can perform actions based on the plant characteristics and/or other characteristics of horticulture environment 1200 that are appropriate for a seed stage of plant growth in accordance with one or more objectives. For example, operation component 704 can customize light output to reduce energy usage since plants 1204a, 1204b, and/or 1204c don't have exposed portions with chlorophyll that convert light, and operation component 704 can provide appropriate resources (e.g. water, fertilizer, feed, temperature, oxygen, or any other suitable resource) to promote germination of the seeds.

Figure 12B:
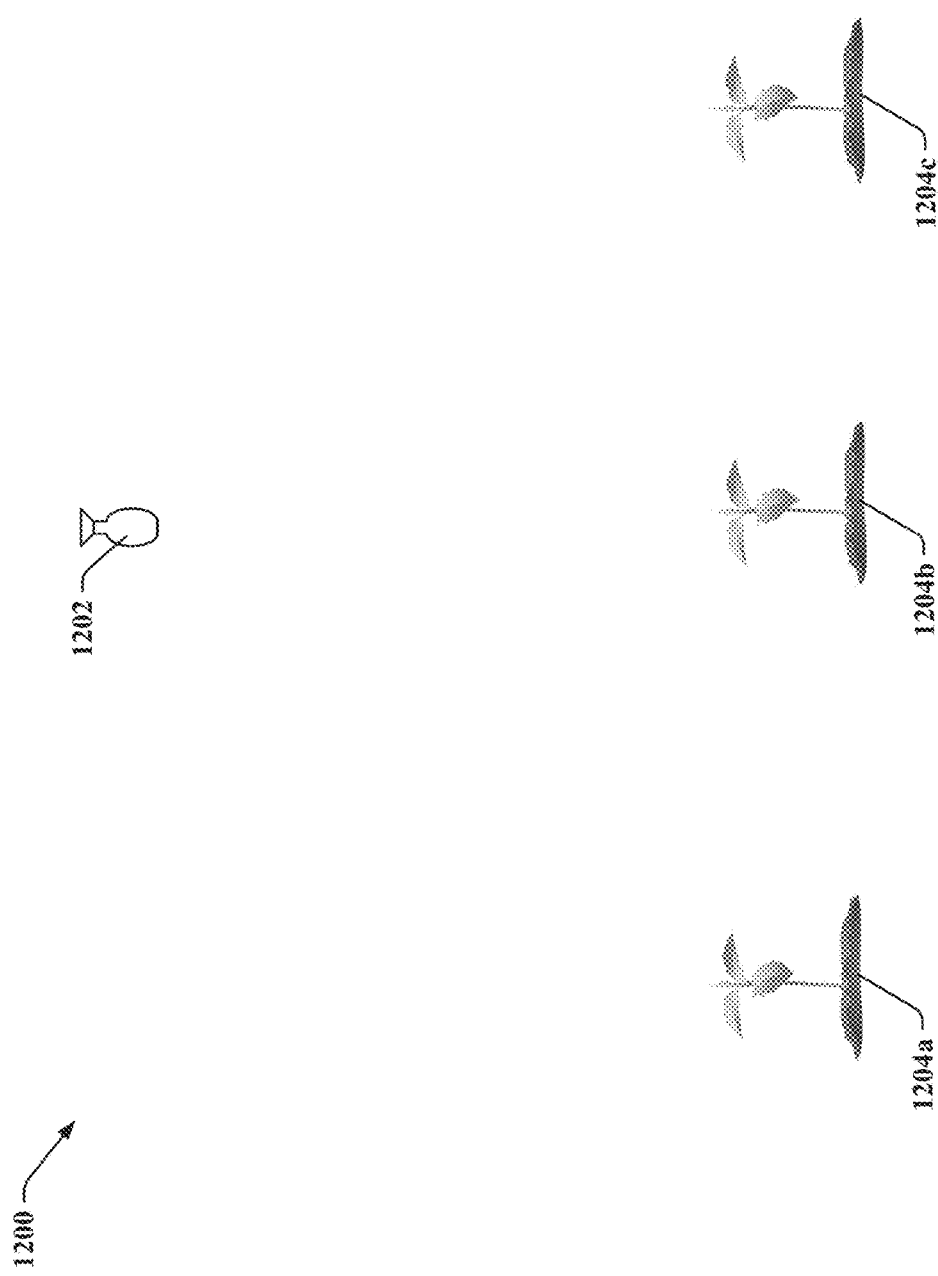

Referring to FIG. 12B. monitoring component 702 of horticulture light 1202 can monitor plant characteristics of plants 1204a, 1204b, and/or 1204c, and determine that plants 1204a, 1204b, and/or 1204c have sprouted. Operation component 704 of horticulture light 1202 can perform actions based on the plant characteristics and/or other characteristics of horticulture environment 1200 that are appropriate for a sprouted plant stage (e.g. vegetative and/or growth stage) of plant growth in accordance with one or more objectives. For example, operation component 704 can customize light output of horticulture light 1202 and/or control systems to promote growth of plants 1204a, 1204b, and/or 1204c to a next stage while maintaining usage of resources in accordance with the one or more objectives.

Referring to FIG. 12C. monitoring component 702 of horticulture light 1202 can monitor plant characteristics of plants 1204a, 1204b, and/or 1204c, and determine that plants 1204a, 1204b, and/or 1204c have grown to a defined size. Operation component 704 of horticulture light 1202 can perform actions based on the plant characteristics and/or other characteristics of horticulture environment 1200 that are appropriate for the current plant stage of growth in accordance with one or more objectives. For example, operation component 704 can customize light output of horticulture light 1202 and/or control usage of resources to promote plants 1204a, 1204b, and/or 1204c to enter a next stage (e.g. reproductive, flowering, and or fruit stage) of plant growth while maintaining usage of resources in accordance with the one or more objectives. For example, operation component 704 can customize light output of horticulture light 1202 in a red light spectrum to stimulate flowering and/or fruit production. In another example, operation component 704 can control a system to provide a particular resource (e.g. chemical, fertilizer, feed, temperature, or any other suitable resource) to plants 1204a, 1204b, and/or 1204c that cause them to produce flowers and/or fruits meeting a defined plant characteristic.

Referring to FIG. 12D. monitoring component 702 of horticulture light 1202 can monitor plant characteristics of plants 1204a, 1204b, and/or 1204c, and determine that plants 1204a, 1204b, and/or 1204c have produced fruit. Operation component 704 of horticulture light 1202 can perform actions based on the plant characteristics and/or other characteristics of horticulture environment 1200 that are appropriate for the current plant stage of growth in accordance with one or more objectives. For example, operation component 704 can send a notification to an operator that plants 1204a, 1204b, and/or 1204c are ready for harvesting. In another example, operation component 704 can control an automated system to harvest the fruits from plants 1204a, 1204b, and/or 1204c. In a further example, operation component 704 can customize light output of horticulture light 1202 and/or control usage of resources to prevent the fruits on plants 1204a, 1204b, and/or 1204c from overripening or rotting.

Referring to FIG. 12R. monitoring component 702 of horticulture light 1202 can monitor plant characteristics of plants 1204a, 1204b, and/or 1204c, and determine that plants 1204a has an insect 1206. Operation component 704 of horticulture light 1202 can perform actions based on the plant characteristics and/or other characteristics of horticulture environment 1200 that are appropriate for the current plant stage of growth in accordance with one or more objectives. For example, operation component 704 can control a system to apply insecticide on plants 1204a, 1204b, and/or 1204c. In a further example, operation component 704 can customize light output of horticulture light 1202 to drive away insect 1206. In an additional example, operation component 704 employ an instrument 510 (e.g. fan, insecticide sprayer, speaker, or any other suitable instrument 510) of horticulture light 1202 to kill or drive away insect 1206. Furthermore, operation component 704 can perform one or more action to prevent insect 1206 from moving to plants 1204b and/or 1204c.

Referring back to FIG. 6, best practices component 606 can learn best practices for efficiently enhancing growth of plants in a horticulture environment. For example, best practices component 606 can employ artificial intelligence to learn best practices for efficiently enhancing growth of plants in the horticulture environment for respective objectives based on historical monitored characteristics, actions performed, and resulting monitored characteristics from the actions. In this manner, best practices component 606 can learn models of operation to achieve the respective objectives for particular characteristics of the horticulture environment. Best practices component 606 can share the learned models of operations with a cloud horticulture platform for use in other horticulture environment. Furthermore, best practices component 606 can obtain learned models of operation from the cloud horticulture platform for use by horticulture light 502 in a horticulture environment in which horticulture light 502 is installed. For example, best practices component 606 can employ characteristics of horticulture environment in which horticulture light 502 is installed to identify one or more models of operation that match the characteristics according to a defined matching criterion, and download the models of operation for use by horticulture light 502.

In another example, best practices component 606 can reside in the cloud horticulture platform and aggregate information (e.g. monitored characteristics, actions performed, and resulting monitored characteristics from the actions) from horticulture lights 502 installed in various environments with different types of plants. Best practices component 606 can employ artificial intelligence to analyze the aggregated information to learn best practices for efficiently enhancing growth of different types of plants in the different types of environments for respective objectives. For example, best practices component 606 can aggregate, from horticulture lights 502 installed in various environments, information, such as objectives, images, audio recordings, sensor readings (e.g. humidity, temperature, ambient lighting, soil moisture, soil chemistry, air quality, water quality, or any other suitable sensor reading), and actions performed (e.g. watering operations, fertilizing operations, lighting output operations, HVAC operations, audio output operations, or any other suitable actions performed. Best practices component 606 can analyze this information using artificial intelligence to learn actions (e.g. light output, control of other devices 518, etc.) to perform by horticulture light 502 to affect characteristics of a particular plant type at a particular stage of plant growth in a particular environment to meet a defined objective. Best practices component 606 can learn respective best practice models of operation for combinations of plant type, environment, and objective.

In an embodiment, best practices component 606 in the cloud horticulture platform can send targeted adds, alerts, notification to horticulture light 502, 520 and/or devices 518 in connection with ordering supplies or equipment, preventive maintenances, etc. to monetize the cloud horticulture platform.

Referring back to FIG. 5, horticulture light 502 can implement a variety of functionality in various embodiments. For example, horticulture light 502 can determine its own operational state (e.g. fault, nearing end of life, etc.) and re-order a replacement or schedule service based on its operational state. In another example, horticulture light 502 can employ pattern/facial recognition to determine a person/activity in the environment and adjust its operation to a preference of the person or for the activity, such as appropriate lighting. In further example, horticulture light 502 can employ pattern recognition to determine a pest (e.g. insect, rodent, etc.) in the environment and adjust lighting and/or employ tools to repel the pest.

While FIGS. 5, 6, and 7 depict separate components in horticulture light 502, it is to be appreciated that two or more components can be implemented in a common component. Further, it is to be appreciated that the design of the horticulture light 502 can include other component selections, component placements, etc., to facilitate determining characteristics of the horticulture environment in which the horticulture light 502 is installed, determining capabilities of horticulture light 502, determining one or more objectives of the installation of horticulture light 502, performing a self-configuration of horticulture light 502 according to the determined one or more objectives, and determining and executing suitable actions for horticulture light 502 to perform to achieve the determined one or more objectives in accordance with one or more embodiments described herein. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed may be performed by specialized computers for carrying out defined tasks related to determining characteristics of the horticulture environment in which the horticulture light 502 is installed, determining capabilities of horticulture light 502, determining one or more objectives of the installation of horticulture light 502, performing a self-configuration of horticulture light 502 according to the determined one or more objectives, and determining and executing suitable actions for horticulture light 502 to perform to achieve the determined one or more objectives. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems for determining characteristics of the horticulture environment in which the horticulture light 502 is installed, determining capabilities of horticulture light 502, determining one or more objectives of the installation of horticulture light 502, performing a self-configuration of horticulture light 502 according to the determined one or more objectives, and determining and executing suitable actions for horticulture light 502 to perform to achieve the determined one or more objectives by improving processing efficiency among processing components in these systems, reducing delay in processing performed by the processing components, reducing memory requirements, and/or improving the accuracy in which the processing systems are determining characteristics of the horticulture environment in which the horticulture light 502 is installed, determining capabilities of horticulture light 502, determining one or more objectives of the installation of horticulture light 502, performing a self-configuration of horticulture light 502 according to the determined one or more objectives, and determining and executing suitable actions for horticulture light 502 to perform to achieve the determined one or more objectives.

It is to be appreciated that the any criteria or thresholds disclosed herein can be pre-defined, operator specified, and/or dynamically determined, for example, based on learning algorithms.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)$=confidence(class). Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 13:
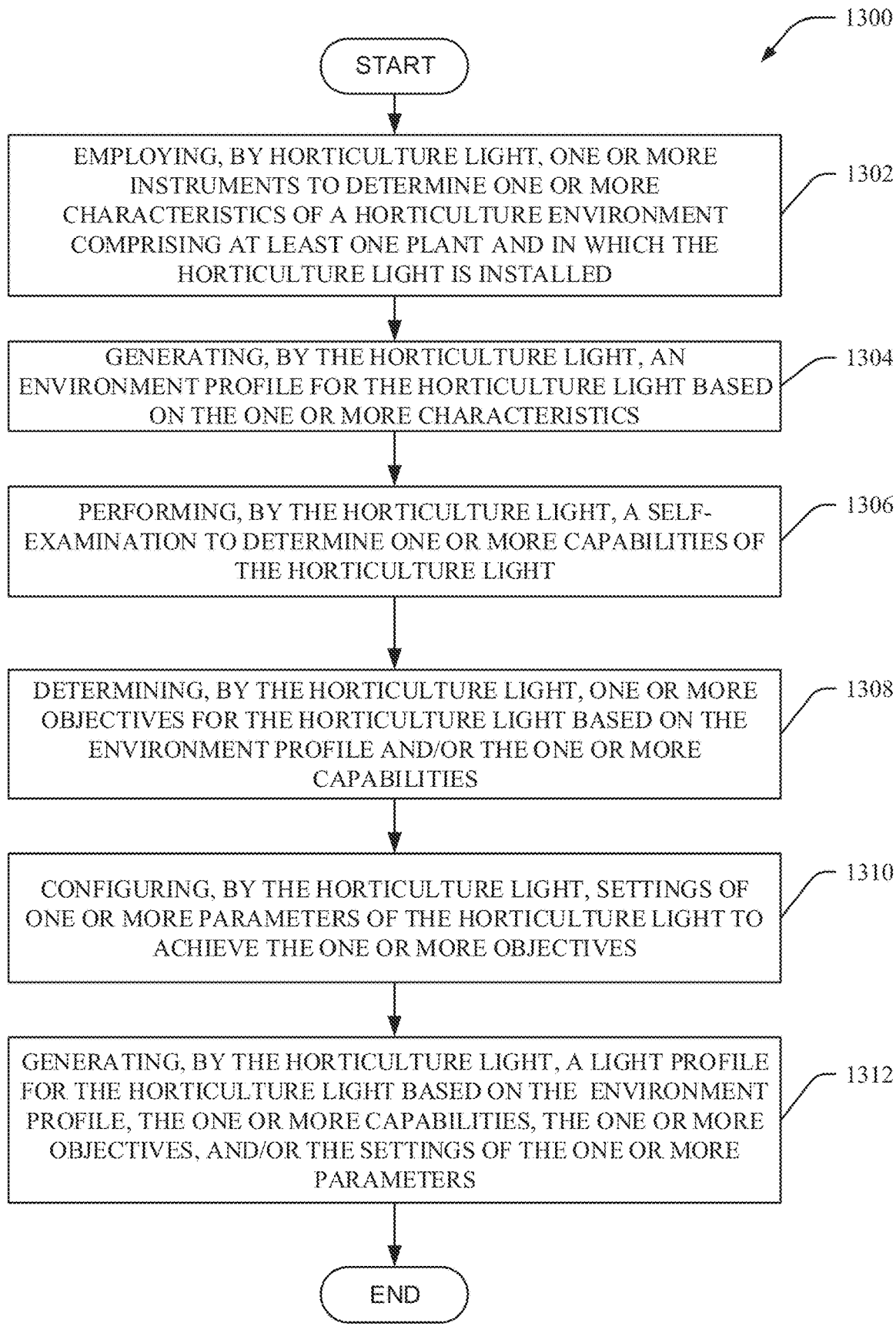
FIG. 13 illustrates a flow diagram of an example, non-limiting computer-implemented method that facilitates self-configuration of a horticulture light in accordance with one or more embodiments described herein.

FIG. 13 illustrates a flow diagram of an example, non-limiting computer-implemented method 1300 that facilitates horticulture light 502 determining characteristics of the horticulture environment in which the horticulture light 502 is installed, determining capabilities of horticulture light 502, determining one or more objectives of the installation of horticulture light 502, and performing a self-configuration of horticulture light 502 according to the determined one or more objectives in accordance with one or more embodiments described herein. Repetitive description of like elements employed in other embodiments described herein is omitted for sake of brevity.

At 1302, method 1300 comprises employing, by horticulture light, one or more instruments to determine one or more characteristics of a horticulture environment comprising at least one plant and in which the horticulture light is installed (e.g., via configuration component 602, horticulture management component 504, and/or horticulture light 502). At 1304, method 1300 comprises generating, by the horticulture light, an environment profile for the horticulture light based on the one or more characteristics (e.g., via configuration component 602, horticulture management component 504, and/or horticulture light 502). At 1306, method 1300 comprises performing, by the horticulture light, a self-examination to determine one or more capabilities of the horticulture light (e.g., via configuration component 602, horticulture management component 504, and/or horticulture light 502). At 1308, method 1300 comprises determining, by the horticulture light, one or more objectives for the horticulture light based on the environment profile and/the one or more capabilities (e.g., via configuration component 602, horticulture management component 504, and/or horticulture light 502). At 1310, method 1300 comprises configuring, by the horticulture light, settings of one or more parameters of the horticulture light to achieve the one or more objectives (e.g., via configuration component 602, horticulture management component 504, and/or horticulture light 502). At 1312, method 1300 comprises generating, by the horticulture light, a light profile for the horticulture light based on the environment profile, the one or more capabilities, the one or more objectives, and/or the settings of the one or more parameters (e.g., via configuration component 602, horticulture management component 504, and/or horticulture light 502).

Figure 14:
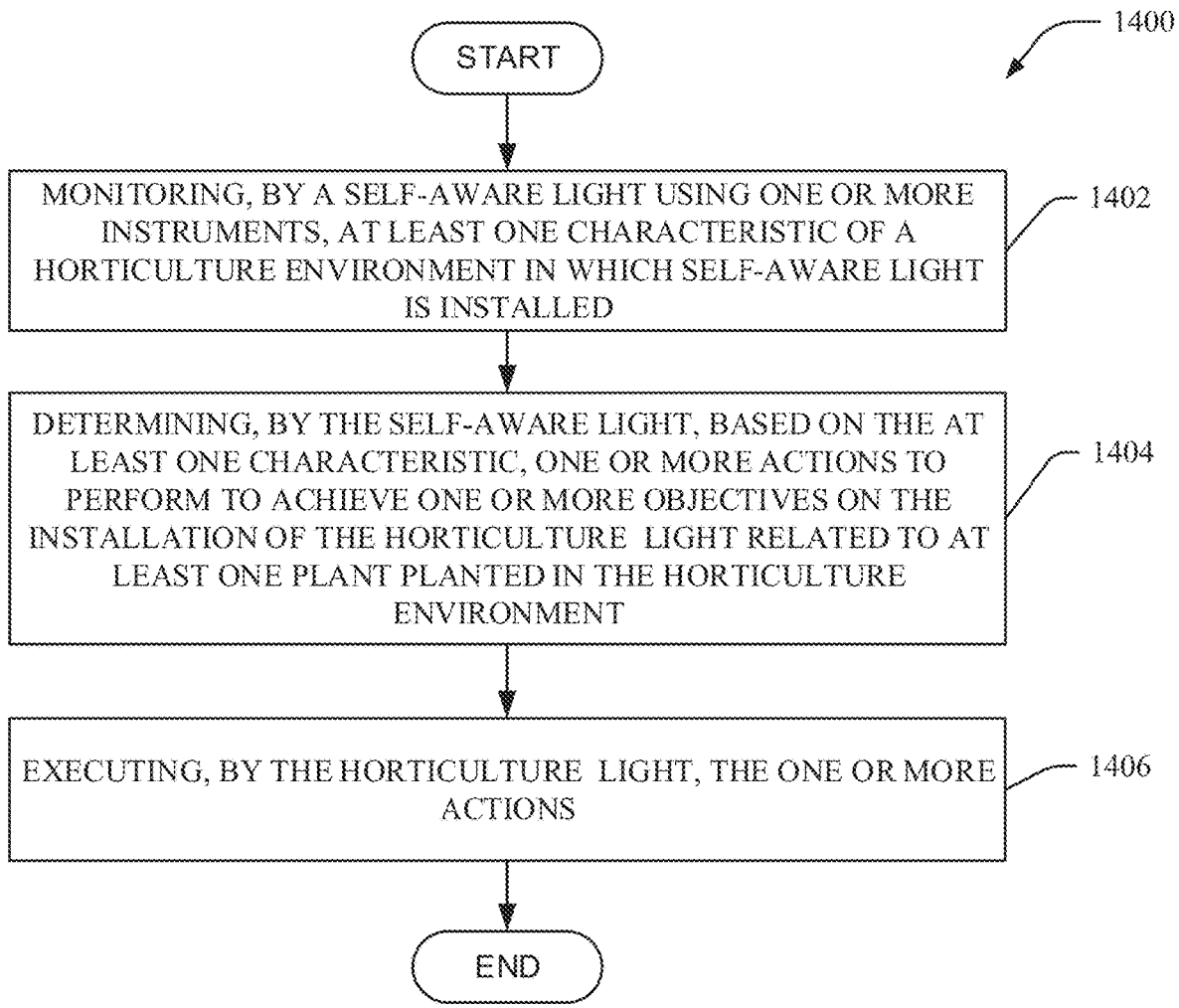
FIG. 14 illustrates a flow diagram of an example, non-limiting computer-implemented method that facilitates operation of a horticulture light in accordance with one or more embodiments described herein.

FIG. 14 illustrates a flow diagram of an example, non-limiting computer-implemented method 1400 that facilitates horticulture light 502 determining and executing suitable actions for horticulture light 502 to perform to achieve the determined one or more objectives in accordance with one or more embodiments described herein. Repetitive description of like elements employed in other embodiments described herein is omitted for sake of brevity.

At 1402, method 1400 comprises monitoring, by a horticulture light using one or more instruments, characteristics of an environment in which horticulture light is installed (e.g., via monitoring component 702, growth management component 604, horticulture management component 504, and/or horticulture light 502). At 1404, method 1400 comprises determining, by the horticulture light, one or more actions to perform to achieve one or more objectives on the installation of the horticulture light related to at least one plant planted in the horticulture environment (e.g., via operation component 704, growth management component 604, horticulture management component 504, and/or horticulture light 502). At 1406, method 1400 comprises executing, by the horticulture light, the one or more actions (e.g., via operation component 704, growth management component 604, horticulture management component 504, and/or horticulture light 502).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 15:
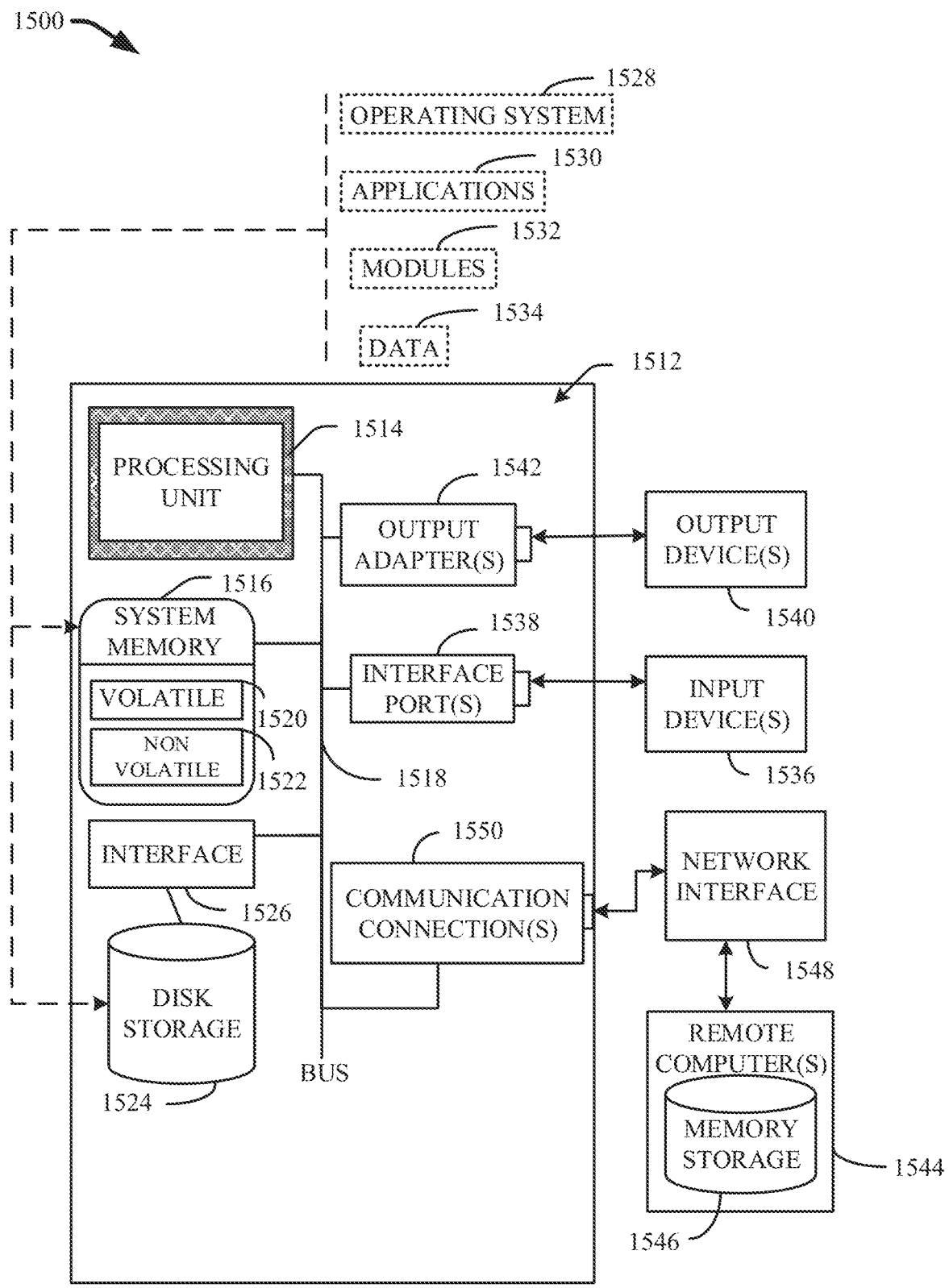
FIG. 15 illustrates a block diagram of an example, non-limiting operating environment in which one or more embodiments described herein can be facilitated.

In order to provide a context for the various aspects of the disclosed subject matter, FIG. 15 as well as the following discussion are intended to provide a general description of a suitable environment in which the various aspects of the disclosed subject matter can be implemented. FIG. 15 illustrates a block diagram of an example, non-limiting operating environment in which one or more embodiments described herein can be facilitated. Repetitive description of like elements employed in other embodiments described herein is omitted for sake of brevity.

With reference to FIG. 15, a suitable operating environment 1500 for implementing various aspects of this disclosure can also include a computer 1512. The computer 1512 can also include a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514. The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1494), and Small Computer Systems Interface (SCSI). The system memory 1516 can also include volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1520 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1512 can also include removable/non-removable, volatile/non-volatile computer storage media. FIG. 15 illustrates, for example, a disk storage 1524. Disk storage 1524 can also include, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1524 to the system bus 1518, a removable or non-removable interface is typically used, such as interface 1526. FIG. 15 also depicts software that acts as an intermediary between users and the basic computer resources described in the suitable operating environment 1500. Such software can also include, for example, an operating system 1528. Operating system 1528, which can be stored on disk storage 1524, acts to control and allocate resources of the computer 1512. System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems. A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port can be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a computer, a server, a router, a network PC, a workstation, a microprocessor based appliance, a peer device or other common network node and the like, and typically can also include many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1550 refers to the hardware/ software employed to connect the network interface 1548 to the system bus 1518. While communication connection 1550 is shown for illustrative clarity inside computer 1512, it can also be external to computer 1512. The hardware/ software for connection to the network interface 1548 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A horticulture light bulb configured for installation in a light fixture, the horticulture light bulb comprising:
   one or more instruments;
   a memory that stores computer executable components; and
   a processor that executes the computer executable components stored in the memory, wherein the computer executable components comprise:
      a monitoring component that employs at least one of the one or more instruments to monitor at least one characteristic of a defined region in which at least one plant is planted in a horticulture environment in which the horticulture light bulb is installed; and
      an operation component that:
         performs at least one artificial intelligence process to determine instructions for at least one action for the horticulture light bulb to perform to achieve at least one objective associated with a health of the at least one plant by modifying the horticulture environment based on a state of the at least one characteristic, and
         executes the at least one action.

2. The horticulture light bulb of claim 1, further comprising a configuration component that actuates the at least one of the one or more instruments to determine a change of the at least one characteristic.

3. The horticulture light bulb of claim 2, wherein at least one of the one or more instruments comprises a sensor, and the at least one characteristic comprises at least one of a plant characteristic, an environmental characteristic, or a resource characteristic.

4. The horticulture light bulb of claim 3, wherein the configuration component:
   determines the at least one objective based on the at least one characteristic; and
   configures the horticulture light bulb to perform the at least one action that facilitates achieving the at least one objective.

5. The horticulture light bulb of claim 1, wherein the at least one action comprises at least one of customization of a light output of the horticulture light bulb or control of a device that regulates usage of a resource of the horticulture environment.

6. The horticulture light bulb of claim 5, wherein the resource relates to at least one of temperature, humidity, water, fertilizer, plant food, pollination, insecticide, fungicide, a chemical, sound, air flow, air quality, a window, a robot, sunlight, or energy.

7. The horticulture light bulb of claim 1, wherein the at least one objective is based on a criterion related to utility of a plant characteristic of the at least one plant and usage of a resource of the horticulture environment.

8. The horticulture light bulb of claim 1, wherein the operation component analyzes historical characteristics of the horticulture environment, historical actions performed in the horticulture environment based on the historical characteristics, and results of the historical actions to further determine the at least one action.

9. The horticulture light bulb of claim 8, further comprising a best practices component that:
   performs at least one machine learning process to learn respective models of operation associated with the horticulture environment for objectives of the at least one objective based on the analysis; and uploads the learned models to a cloud horticulture platform for sharing with a remote horticulture light bulb installed in another horticulture environment.

10. The horticulture light bulb of claim 1, wherein the at least one action comprises coordination with at least one other horticulture light bulb to execute the at least one action.

11. The horticulture light bulb of claim 1, wherein the one or more instruments comprises a camera.

12. A horticulture light comprising:
a horticulture light bulb configured for installation in a horticulture light fixture;
one or more instruments located in at least one of the horticulture light bulb or the horticulture light fixture;
a memory that stores computer executable components; and
a processor that executes the computer executable components stored in the memory, wherein the computer executable components comprise:
a monitoring component that employs at least one instrument of the one or more instruments to monitor at least one characteristic of a defined region in which at least one plant is planted in a horticulture environment in which the horticulture light is installed; and
an operation component that:
performs at least one artificial intelligence process to determine instructions for at least one action for the horticulture light to perform achieve at least one objective associated with a health of the at least one plant by modifying the horticulture environment based on a state of the at least one characteristic, and
executes the at least one action.

13. The horticulture light of claim 12, wherein the at least one characteristic comprises at least one of a plant characteristic, an environmental characteristic, or a resource characteristic.

14. The horticulture light of claim 12, wherein the at least one objective relates to at least one of maximizing plant growth, maximizing fruit bearing, maximizing profits, minimizing energy usage, achieving a defined plant characteristic, or balancing resource usage versus plant growth according to a defined criterion.

15. The horticulture light of claim 12, further comprising a configuration component that probes a system bus of the horticulture light to determine one or more capabilities of the of the horticulture light bulb.

16. The horticulture light of claim 15, wherein the operation component further determines the at least one action based on the determined one or more capabilities of the of the horticulture light bulb.

17. The horticulture light of claim 12, wherein the at least one action comprises employment of a tool included in the one or more instruments.

18. A method comprising:
determining, by a horticulture light bulb via one or more instruments of the horticulture light bulb, one or more characteristics of a horticulture environment in which the horticulture light bulb is installed;
determining, by the horticulture light bulb, one or more capabilities of the horticulture light bulb;
performing at least one artificial intelligence process to generate, by the horticulture light bulb, one or more objectives for the horticulture light bulb by modifying the horticulture environment based on the one or more characteristics and the one or more capabilities; and
configuring, by the horticulture light bulb, an operation of the horticulture light bulb to achieve the one or more objectives associated with a health state of at least one plant planted in the horticulture environment.

19. The method of claim 18, further comprising:
monitoring, by the horticulture light bulb, the one or more characteristics of the horticulture environment using the one or more instruments;
determining, by the horticulture light bulb, one or more actions to perform to achieve the one or more objectives;
executing, by the horticulture light bulb, the one or more actions.

20. The method of claim 19, wherein the one or more actions comprises controlling a system in the horticulture environment that regulates usage of a resource of the horticulture environment on the at least one plant.

* * * * *